United States Patent

Corn

Patent Number: 5,833,299
Date of Patent: Nov. 10, 1998

[54] VEHICLE SUNVISOR

[76] Inventor: Jack E. Corn, 1644 S. Jamestown, Tulsa, Okla. 74112

[21] Appl. No.: 740,469

[22] Filed: Oct. 30, 1996

Related U.S. Application Data

[63] Continuation-in-part of Ser. No. 311,419, Sep. 23, 1994, abandoned, which is a continuation-in-part of Ser. No. 917,970, Jul. 24, 1992, Pat. No. 5,350,212.

[51] Int. Cl.⁶ .................................................. B60J 3/02
[52] U.S. Cl. ..................................... 296/97.11; 296/97.12
[58] Field of Search ................................. 296/97.4, 97.9, 296/97.11, 97.12

[56] References Cited

U.S. PATENT DOCUMENTS

| | | | |
|---|---|---|---|
| 1,755,734 | 4/1930 | Hall . | |
| 1,790,412 | 1/1931 | Dodge . | |
| 1,848,090 | 3/1932 | Stein . | |
| 1,931,438 | 10/1933 | Hitz | 296/97 |
| 2,638,377 | 5/1953 | George | 296/97 |
| 2,862,762 | 12/1958 | McCormick | 296/97.11 |
| 2,978,274 | 4/1961 | Ordman | 296/97 |
| 3,226,151 | 12/1965 | Reuther | 296/97 |
| 3,226,152 | 12/1965 | Reuther | 296/97 |
| 3,343,868 | 9/1967 | Manookian, Jr. | 296/97 |
| 3,403,937 | 10/1968 | Quaine | 296/97 |
| 4,205,873 | 6/1980 | Viertel | 296/97 |
| 4,353,593 | 10/1982 | Henson | 296/97 |
| 4,512,605 | 4/1985 | Aschermann et al. | 296/97.11 |
| 4,674,789 | 6/1987 | Watjer et al. | 296/97 |
| 4,697,843 | 10/1987 | Tomforde | 296/97 |
| 4,824,160 | 4/1989 | Fleming | 210/17.4 |
| 4,902,062 | 2/1990 | Pumic | 296/97.4 |
| 4,904,013 | 2/1990 | Canadas | 296/97.4 |
| 4,919,468 | 4/1990 | Abu-Shumays et al. | 296/97.4 |
| 4,925,233 | 5/1990 | Clark | 296/97.11 |
| 5,000,506 | 3/1991 | Abu-Shumays et al. | 296/97.4 X |
| 5,004,288 | 4/1991 | Viertel et al. | 296/97.11 |
| 5,031,952 | 7/1991 | Miyamoto et al. | 296/97.4 |
| 5,158,334 | 10/1992 | Felland | 296/97.4 |
| 5,219,199 | 6/1993 | Smith et al. | 296/97.8 |
| 5,350,212 | 9/1994 | Corn | 296/97.4 |

FOREIGN PATENT DOCUMENTS

| | | | |
|---|---|---|---|
| 55-68422 | 5/1990 | Japan | 296/97.4 |
| 2-208120 | 8/1990 | Japan | 296/97.4 |
| 2-212220 | 8/1990 | Japan | 296/97.4 |

*Primary Examiner*—Dennis H. Pedder
*Attorney, Agent, or Firm*—Head, Johnson & Kachigian

[57] ABSTRACT

A sunvisor attached to a vehicle. The sunvisor includes a sunvisor shell and a track assembly having a first portion and a second portion in angular relation to the first portion. A pair of blocks are provided, each block pivotally attached to the shell. The blocks slidably move within the track assembly through use of a belt that is attached to at least one block and that travels within the track assembly. A motor rotates a drive gear to move the belt in order to change the angular relation of the shell to the vehicle. An additional embodiment provides an elongated opening with a support rod passing through the elongated opening. The sunvisors support rod has a clamp compressing against the rod and capable of sliding forward and rearward in the elongated opening. The clamp also can rotate upon the rod thereby allowing the shell to be rotated into use.

3 Claims, 14 Drawing Sheets

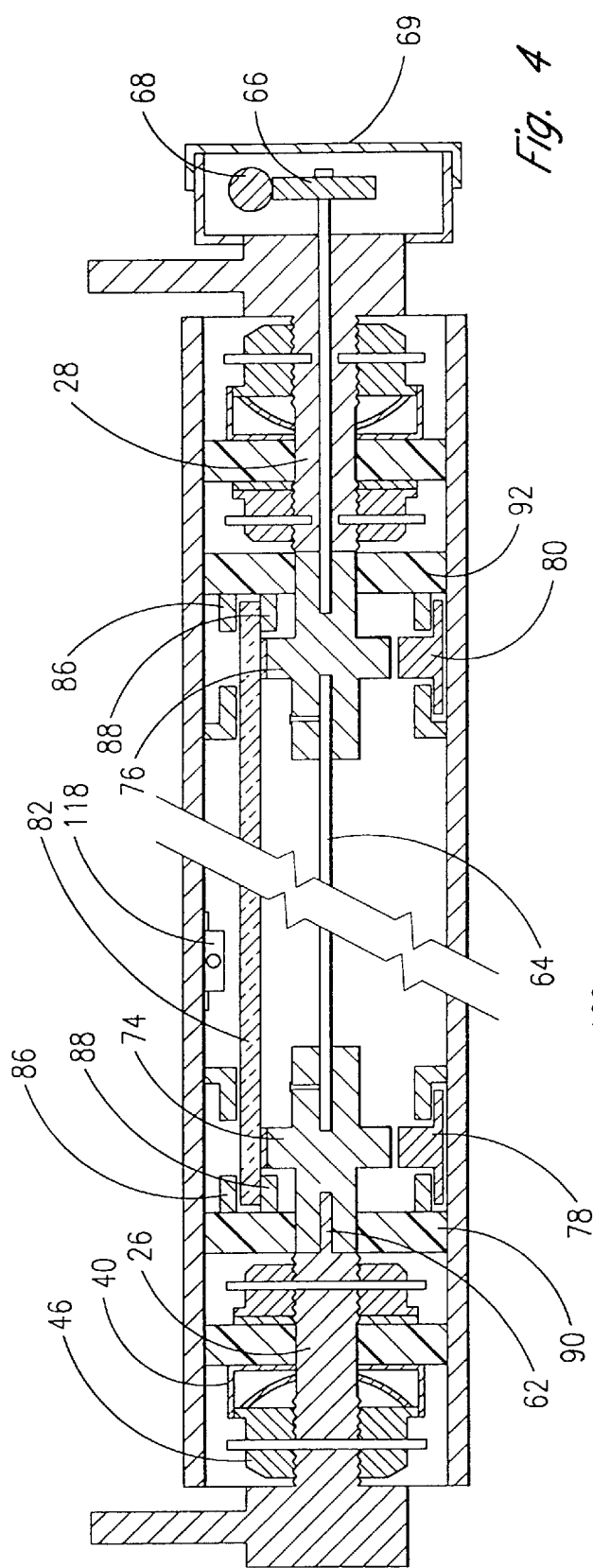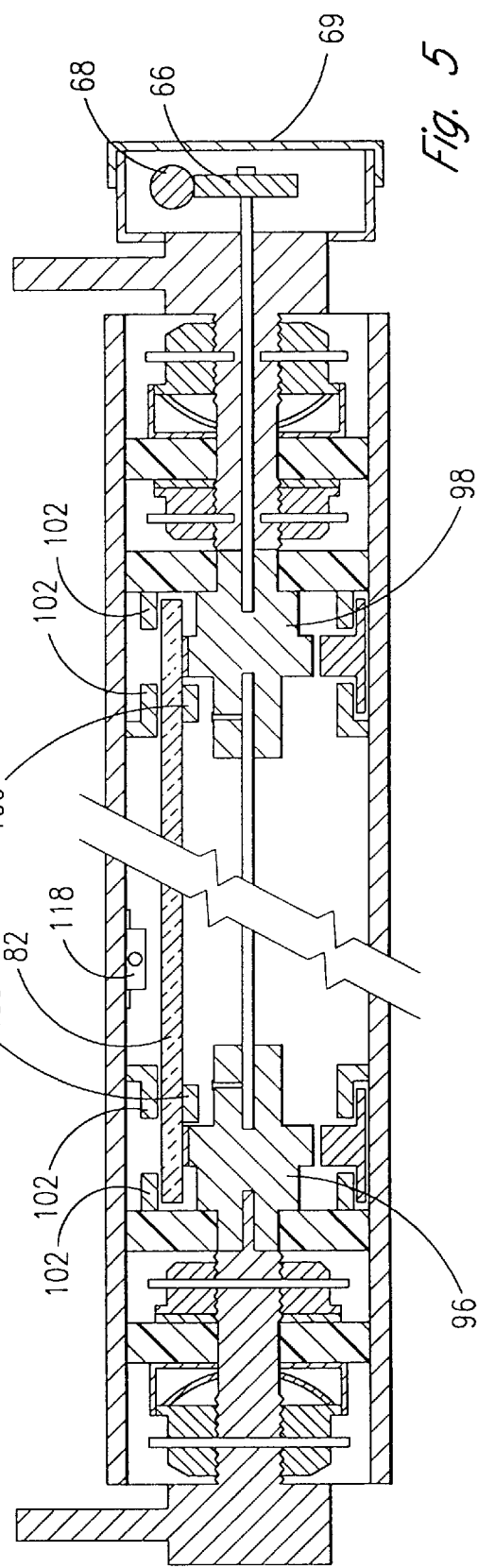

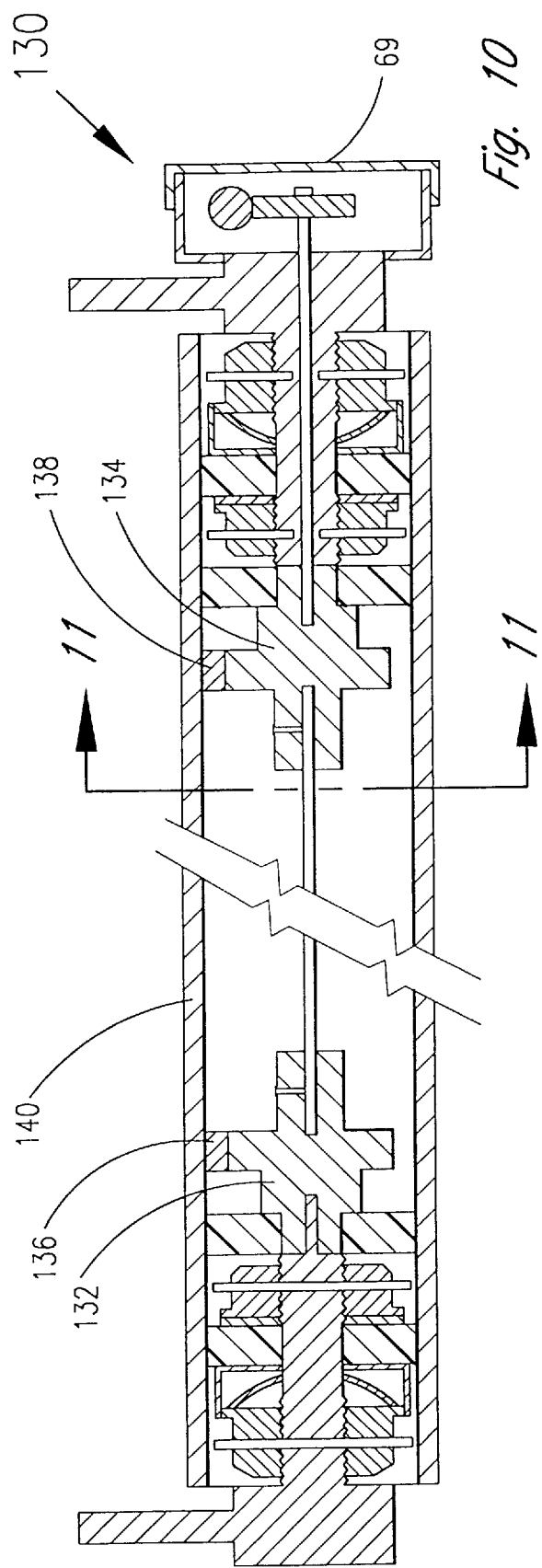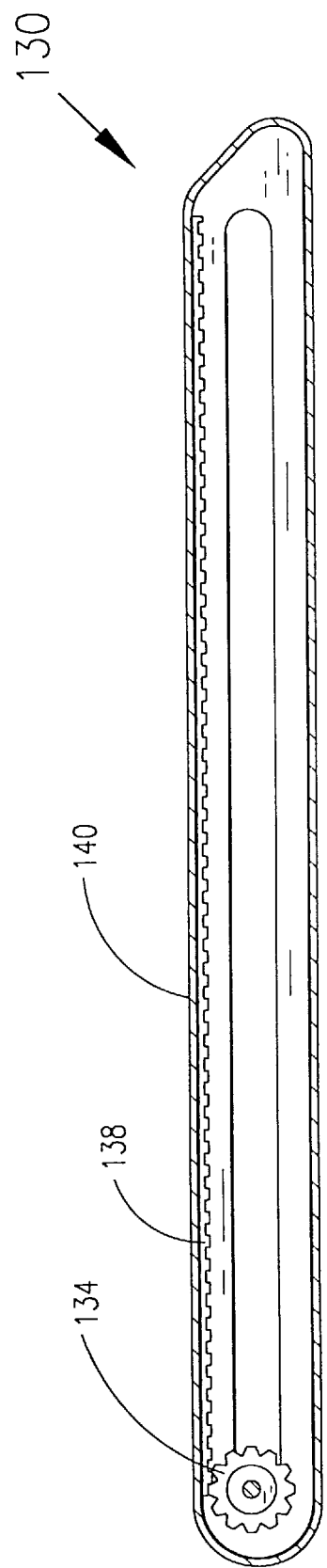

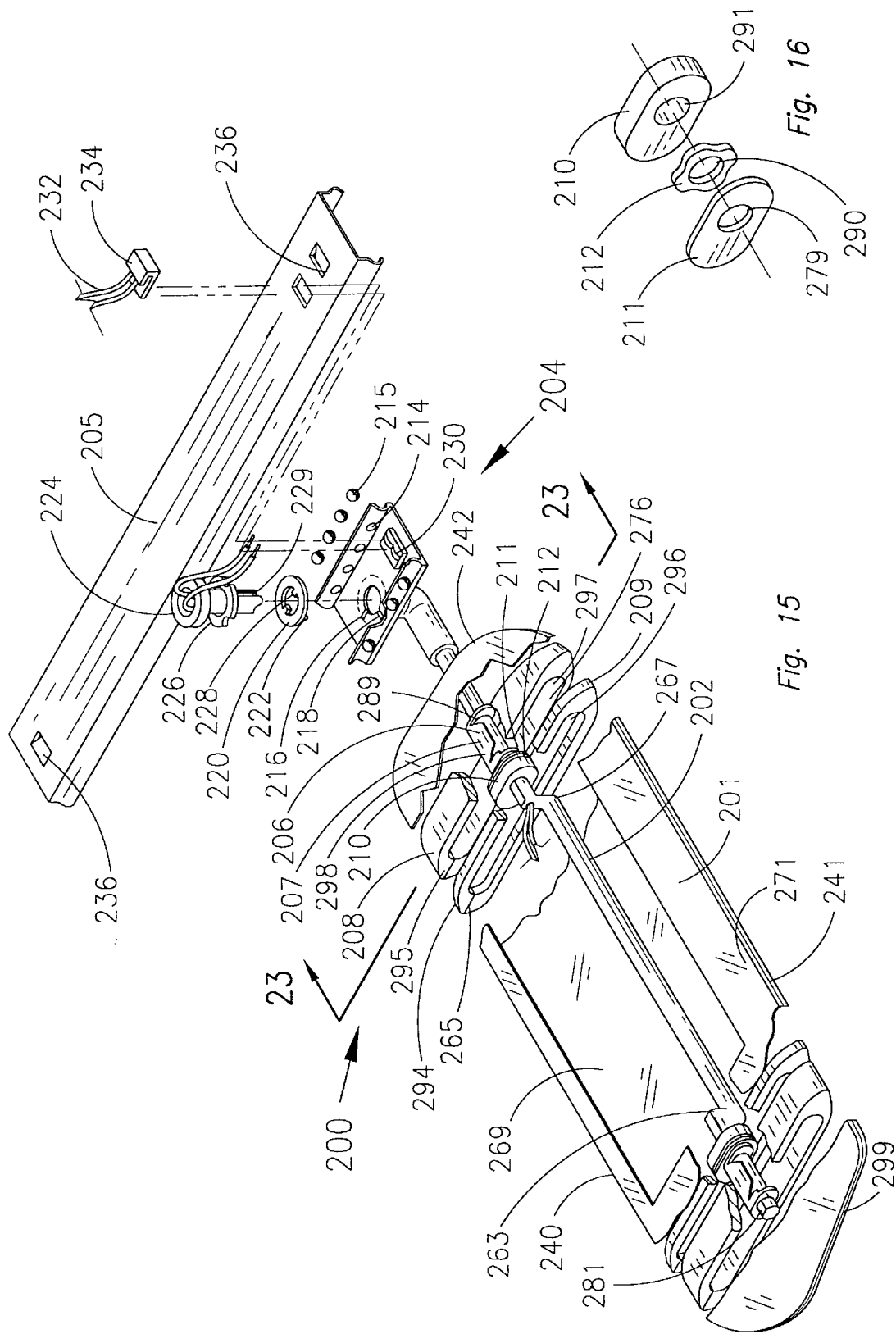

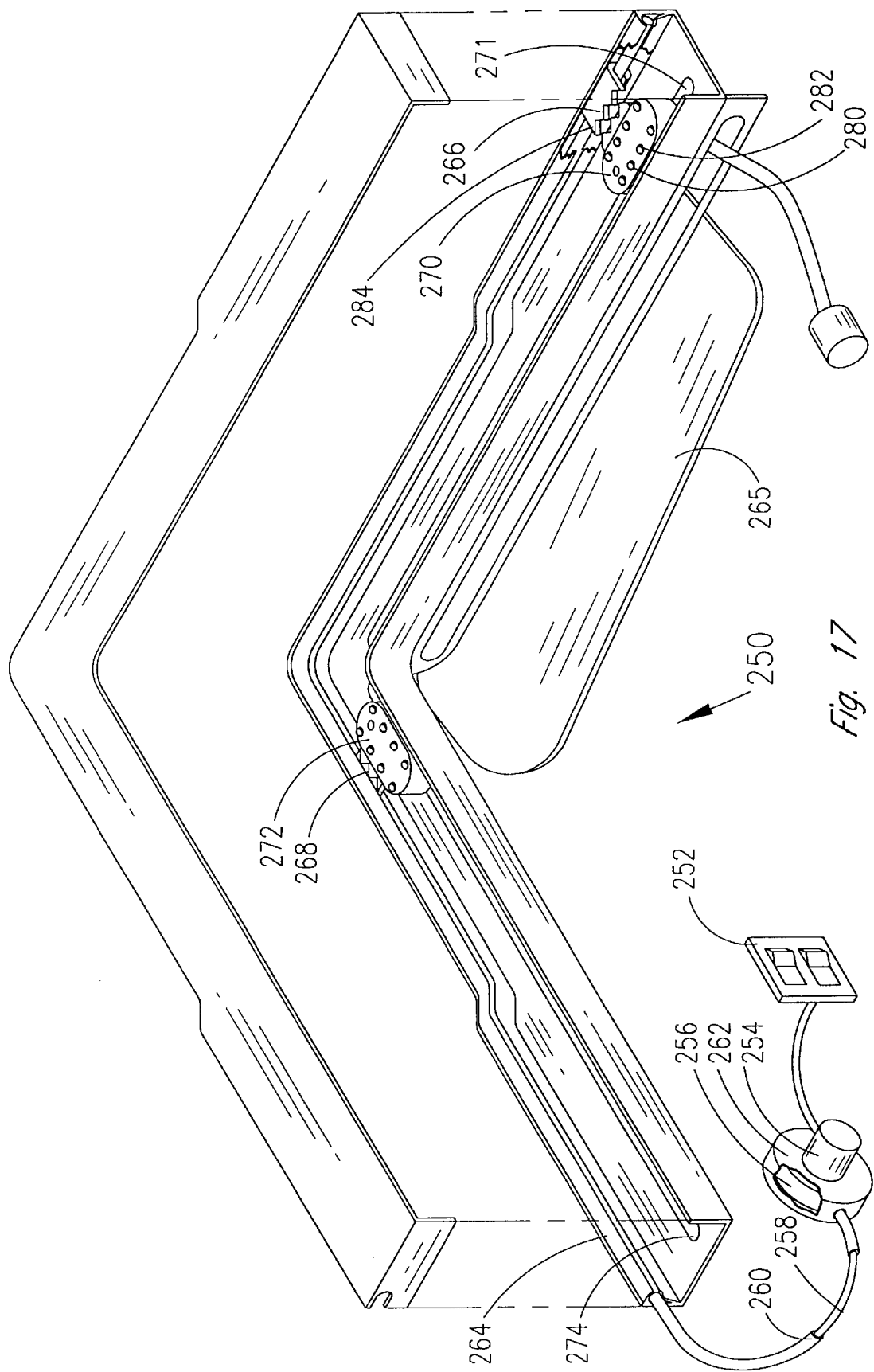

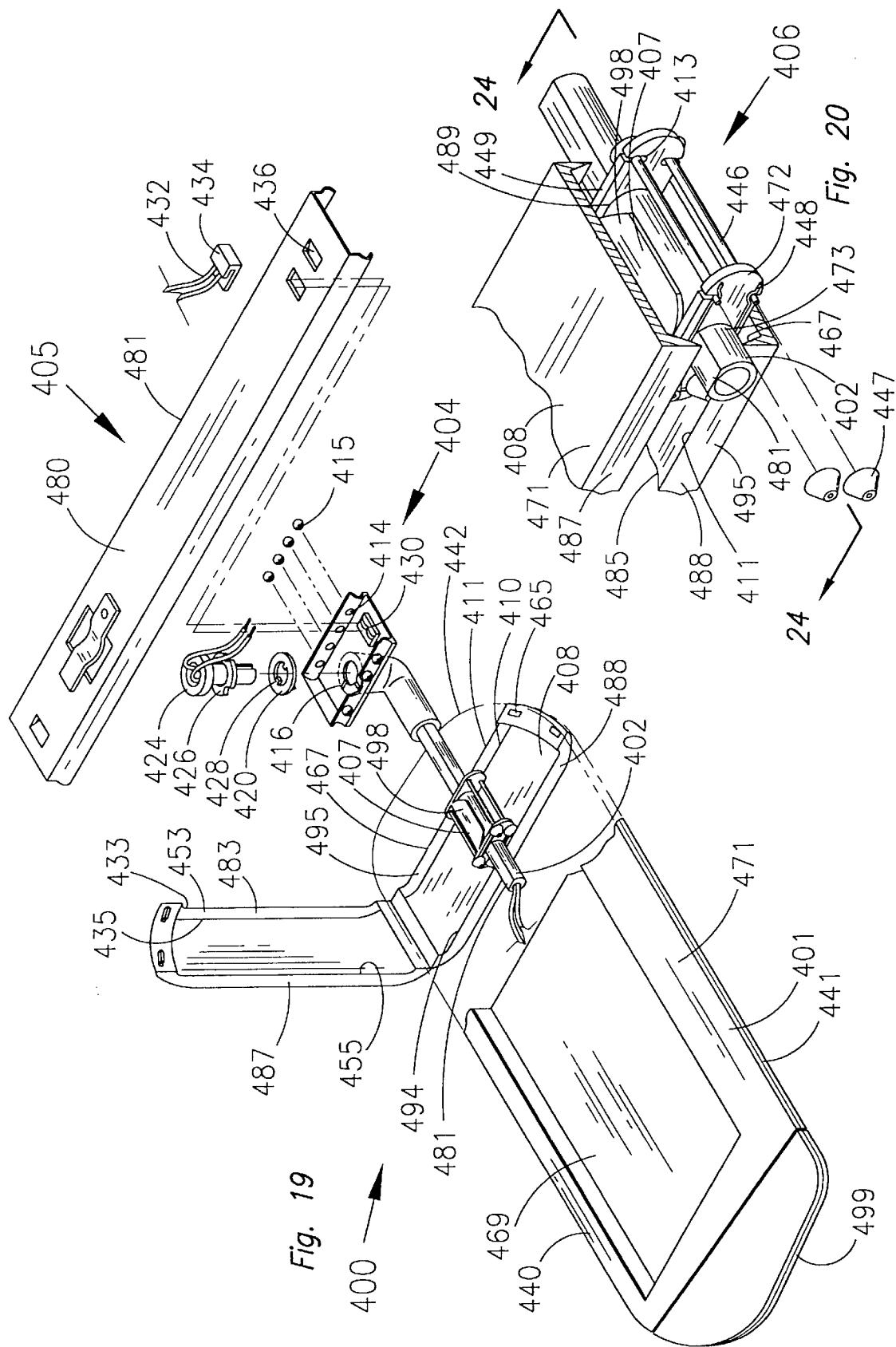

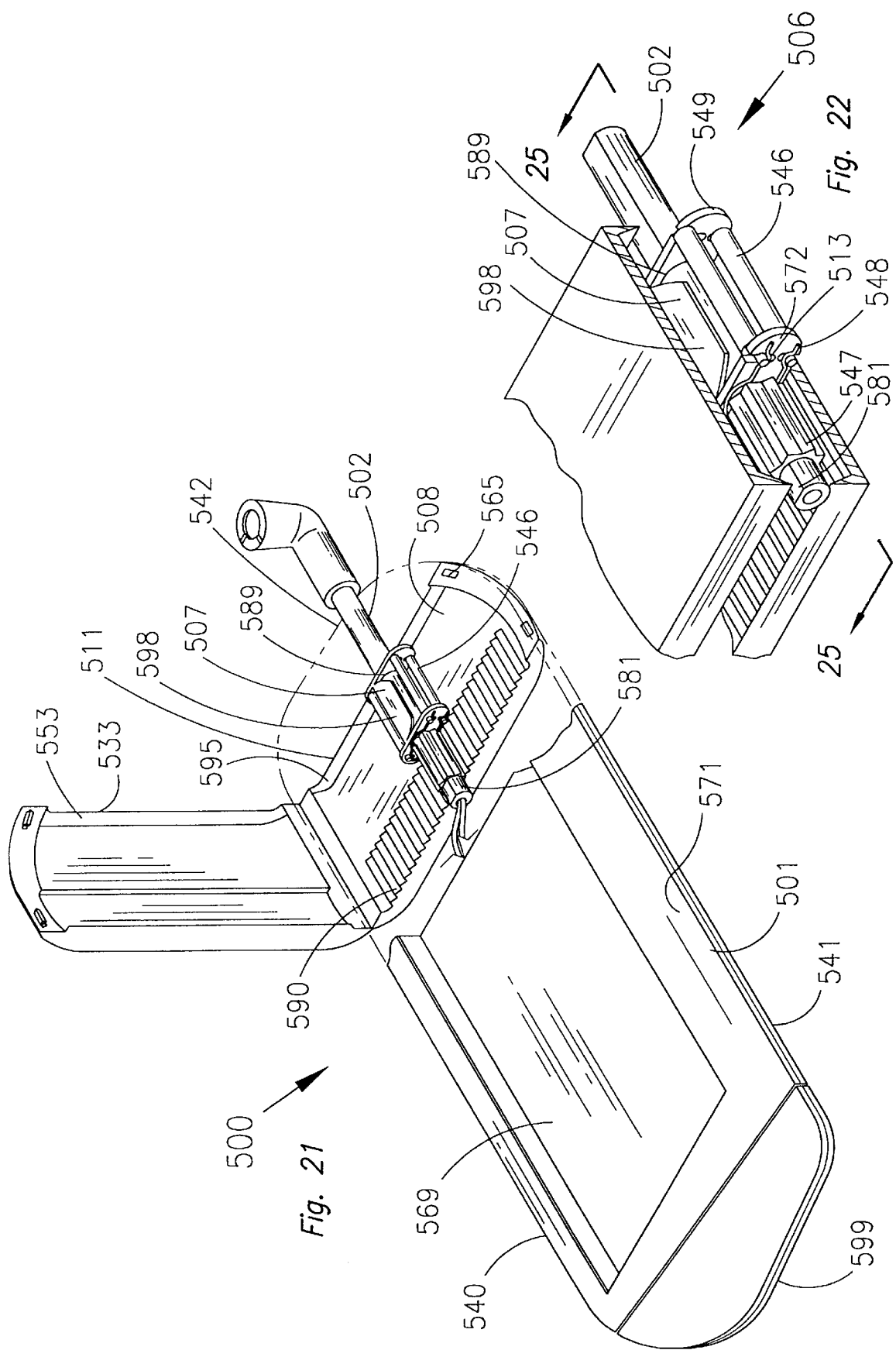

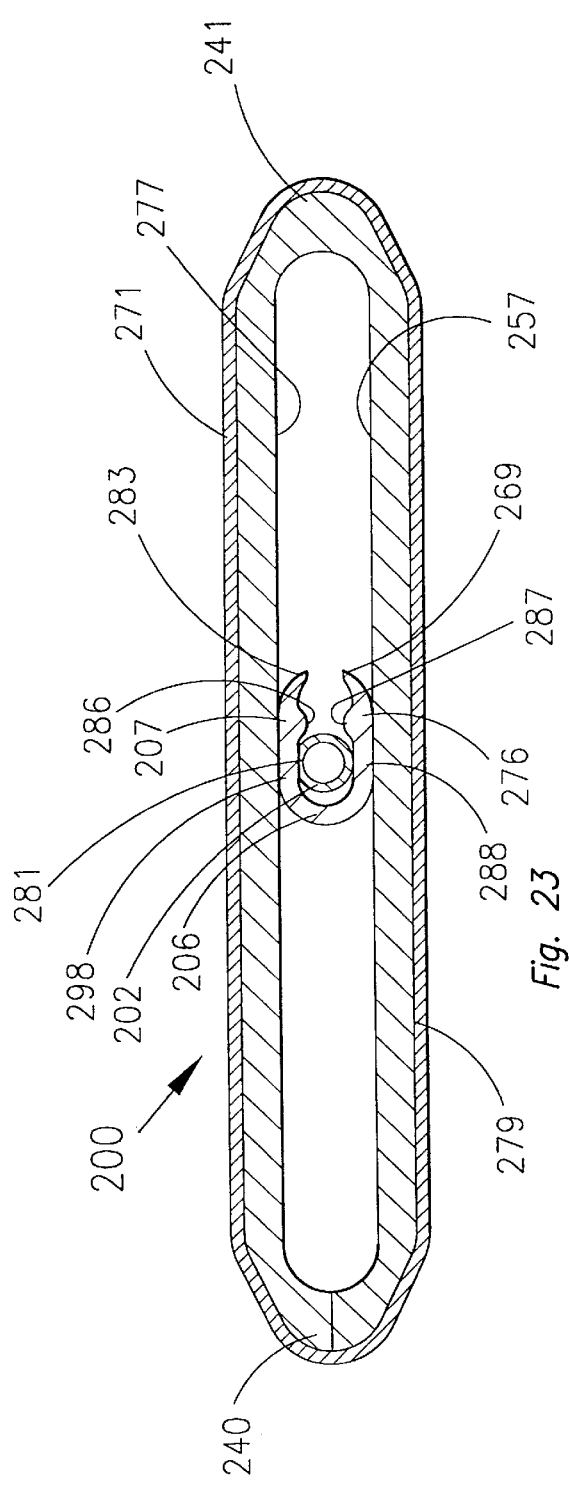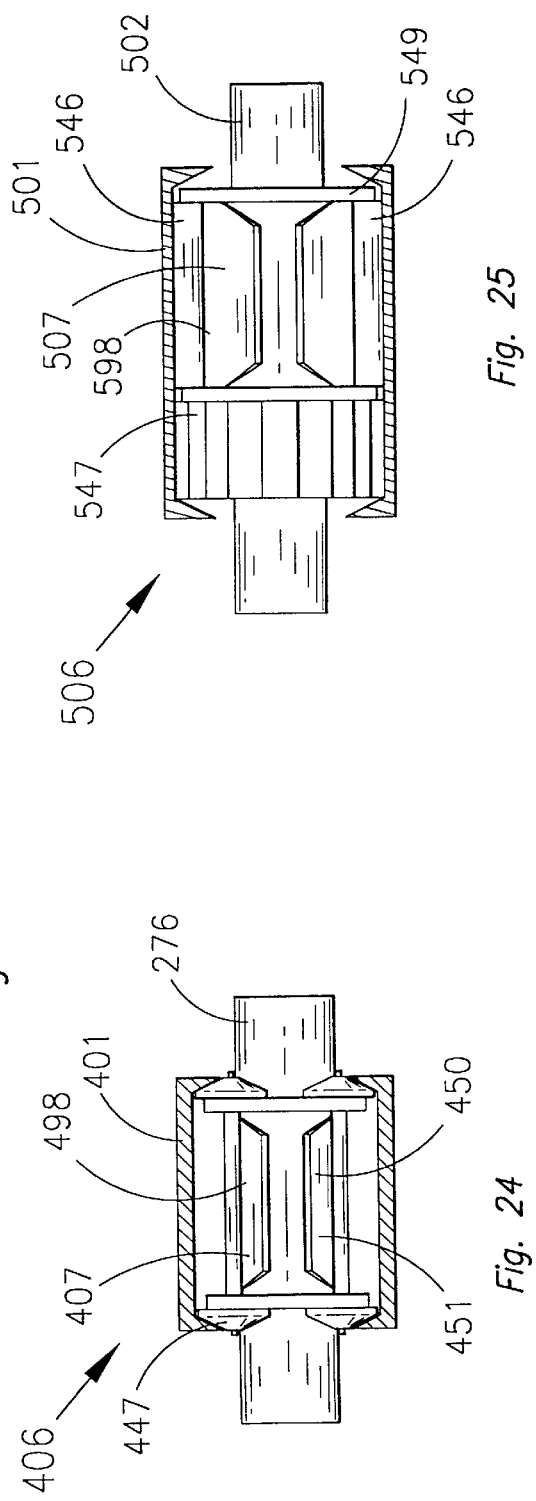

VEHICLE SUNVISOR

BACKGROUND OF THE INVENTION

This is a continuation-in-part of application Ser. No. 08/311,419, filed Sep. 23, 1994, now abandoned, entitled VEHICLE SUNVISOR, which is a continuation-in-part of application Ser. No. 07/917,970, filed Jul. 24, 1992, entitled VEHICLE SUNVISOR GLARESHIELD, now U.S. Pat. No. 5,350,212.

BACKGROUND OF THE INVENTION

1. Field of the Invention

The present invention pertains to a sunvisor for a vehicle which is adjustable to a multitude of positions. In particular, the present invention pertains to a sunvisor which may be mechanically adjusted to a multitude of positions including on the front and passenger side. A glare shield panel may be placed within the sunvisor for selective deployment.

2. Prior Art

Sunvisors for automobiles and the like are well known. In the most common sunvisor, shaft or arms extend from or are located in the roof or headliner of the vehicle. These form an axis for rotation of the sunvisor itself which can move from a position substantially flush and parallel to the headliner to a position in angular relation therewith so that the sun is blocked from the eyes of the driver or passenger.

More recent proposals have allowed the sunvisor to move about a track such as Miyamoto et al. (U.S. Pat. No. 5,031,952).

Several arrangements have been provided whereby the movement of the sunvisor is mechanized. Prior art has failed to address an effective means of moving a visor or visor-glare shield into an in use position in a plane parallel to the roof line of a vehicle, and still have the versatility of moving the visor to the side window position by sliding or pivoting the visor to that position. The present invention addresses these problems by allowing the visor and glare shield to be operated by a simpler engagement means between the visor and glare shield components. The glare shield visor can be moved into unlimited positions using the guides, elongated slots and channels proposed in this invention.

Accordingly, it is a principal object and purpose of the present invention to provide a sunvisor device having a pair of blocks pivotally attached to a sunvisor shell and a mechanism to slidably move a belt extending between the blocks and attached to at least one block. It is a principal object and purpose of the present invention to provide a sunvisor device having a pair of engagement carriages pivotally attached to a sunvisor shell and a mechanism to slidably move the engagement carriages within the track assembly.

It is a further object and purpose of the present invention to provide a sunvisor device having a slot to allow a sunvisor shell to move radially about a rod passing therethrough and an oblong clamp surrounding the rod to allow the sunvisor shell to move linearly upon the oblong clamp.

SUMMARY OF THE INVENTION

The sunvisor of the present invention includes a sunvisor shell which is connected to a support assembly. The support assembly would be fastened or otherwise attached to the headliner or roof of the vehicle. The support assembly in a preferred embodiment is a track and comprises a first portion and a second portion in angular relation to the first portion.

Extending from the support assembly is a pair of boot arms. Each boot arm terminates in a boot which extends radially from its respective boot arm. Each boot arm has a pivot joint so that each boot is rotatable radially.

The sunvisor can also include a gear drive mechanism. A shaft passes through one of the boots and extends to a gear which is drivingly engaged with a worm gear. The worm gear is at the terminus of a rotatable, flexible shaft. The flexible shaft is rotated by a motor.

The shaft, interior to the sunvisor shell, turns a pair of gears which extend radially from the shaft. Each gear meshes with a rack. Rotation of the shaft will cause the gears to rotate. Rotation of the gears causes the racks to move linearly moving the sun visor shell.

A glare shield can be attached to the racks. In this embodiment, the racks are extendible, flexible and not permanently secured to the sunvisor shell. A switch may be operated so that the rack is either movable with respect to the shell or is stationary with respect to the shell. When the racks are stationary with respect to the shell, the rotation of the gears causes the shell to move with respect to the boots. Alternatively, when the switch allows the racks to move, rotation of the gears causes the racks to move which in turn causes linear movement of a glare shield which is in the initial position within the shell. Depending upon rotation of the gears, the glare shield will either extend from the shell or will retract into the shell through an opening upon the shell.

The glare shield is retained between support rails and rack gear retaining rails. The movement of the sunvisor shell and the glare shield is accomplished by a motor which is controlled by a switch.

A solenoid operates a plunger which may have an extension. When the plunger extension is extended, the racks are stationary with respect to the sunvisor shell and the shell will move. When the plunger extension is retracted, by operation of the solenoid, rotation of the gears will move the racks, thereby moving the glare shield.

The sunvisor may also be arranged so that the sunvisor shell is on either the driver window or the passenger window side. Each boot arm terminates in a block which is allowed to travel within the support assembly. A continuous belt travels within the track and passes around each block and is attached to at least one block. Rotation of a track assembly gear by a track motor will move the blocks. Accordingly, the sunvisor shell may be moved between the position for use in the front window and for use in the side window.

A further embodiment includes a sunvisor shell with an elongated opening through at least one end. A support rod is attached to a mount in the vehicle and then passes through the elongated opening into the shell. A clamp surrounds and grasps the rod and rides within an elongated clamp support structure. The visor and clamp may be rotated about the rod or the visor shell may be slid over the clamp forward or rearward parallel the headliner of the vehicle.

BRIEF DESCRIPTION OF THE DRAWINGS

FIG. 4 is a sectional view taken along section line 4—4 of FIG. 1;

FIG. 5 is a sectional view of an alternate embodiment of the sunvisor;

FIG. 10 is a sectional view of an alternate embodiment of the sunvisor without a glare shield;

FIG. 11 is a sectional view taken along section line 11—11 of FIG. 10;

FIGS. 15 and 16 are exploded views of a further alternate embodiment of the sunvisor which may be manually positioned;

FIG. 17 is an alternate embodiment of the track assembly for the present invention;

FIGS. 19 and 20 are exploded views of a further alternate embodiment of the sunvisor which may be manually positioned;

FIGS. 21 and 22 are exploded views of a further alternate embodiment of the sunvisor which may be manually positioned; and FIG. 23 is a sectional view taken along section line 23—23 of FIG. 15.

FIG. 24 is a sectional view of the shell taken along section line 24—24 of FIG. 20.

FIG. 25 is a sectional view of the shell taken along section line 25—25 of FIG. 22.

DETAILED DESCRIPTION OF THE PREFERRED EMBODIMENTS

Figure 1:
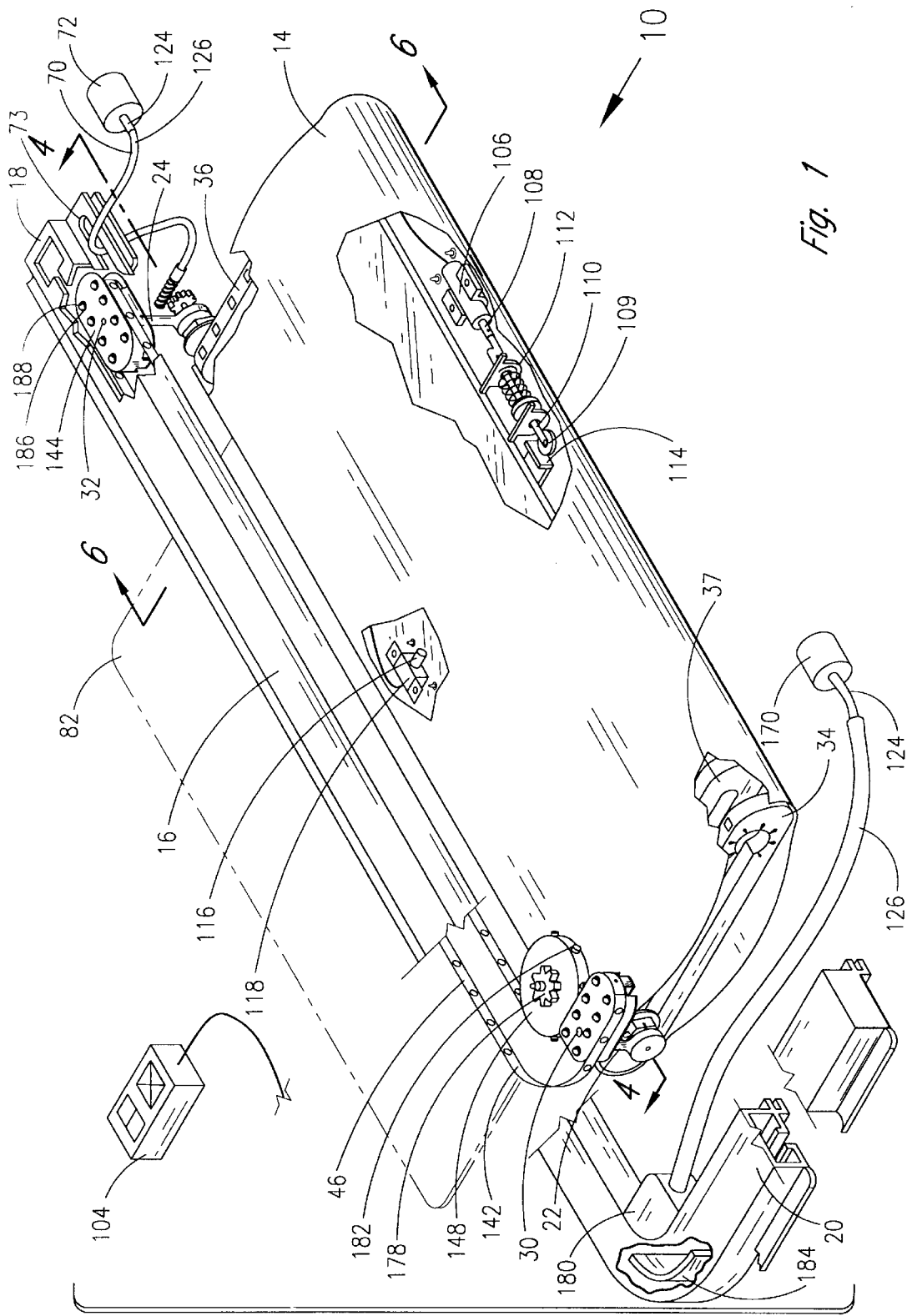
FIG. 1 is a perspective view of a sunvisor device constructed in accordance with the present invention showing several portions cut-away for clarity.

Referring to the drawings in detail, FIG. 1 illustrates a perspective view of a sunvisor 10 constructed in accordance with the present invention which is shown apart and detached from a vehicle (not shown) and, for purposes of understanding, has the gear moved to the right, and the flexible shaft slot is cutaway. The sunvisor includes a sunvisor shell 14 which may be made of any suitable material such as plastic, fiberglass or metal. The shell may be covered with a material for a finished look and to match the interior of the vehicle.

The sunvisor shell can be connected with a support assembly 16 such as a track. The track assembly 16 would be connected or attached to the headliner or roof of the vehicle (not shown). The retrack assembly includes a first portion 18 which would be spaced from and substantially parallel with the front windshield. The track assembly also can include a second portion 20 in angular relation to the first portion and is substantially parallel with the driver front window. It will be understood that the track assembly may, alternatively, have a second portion parallel with the passenger front window. The operation of the track assembly will be explained in detail below.

Extending from the track assembly 16 is a pair of boot arms 22 and 24. Each boot arm terminates in a boot 26 and 28, respectively, which extends radially from each boot arm. Each boot arm has a pivot joint 30 and 32, respectively, so that each boot is rotatable radially.

Figure 2:
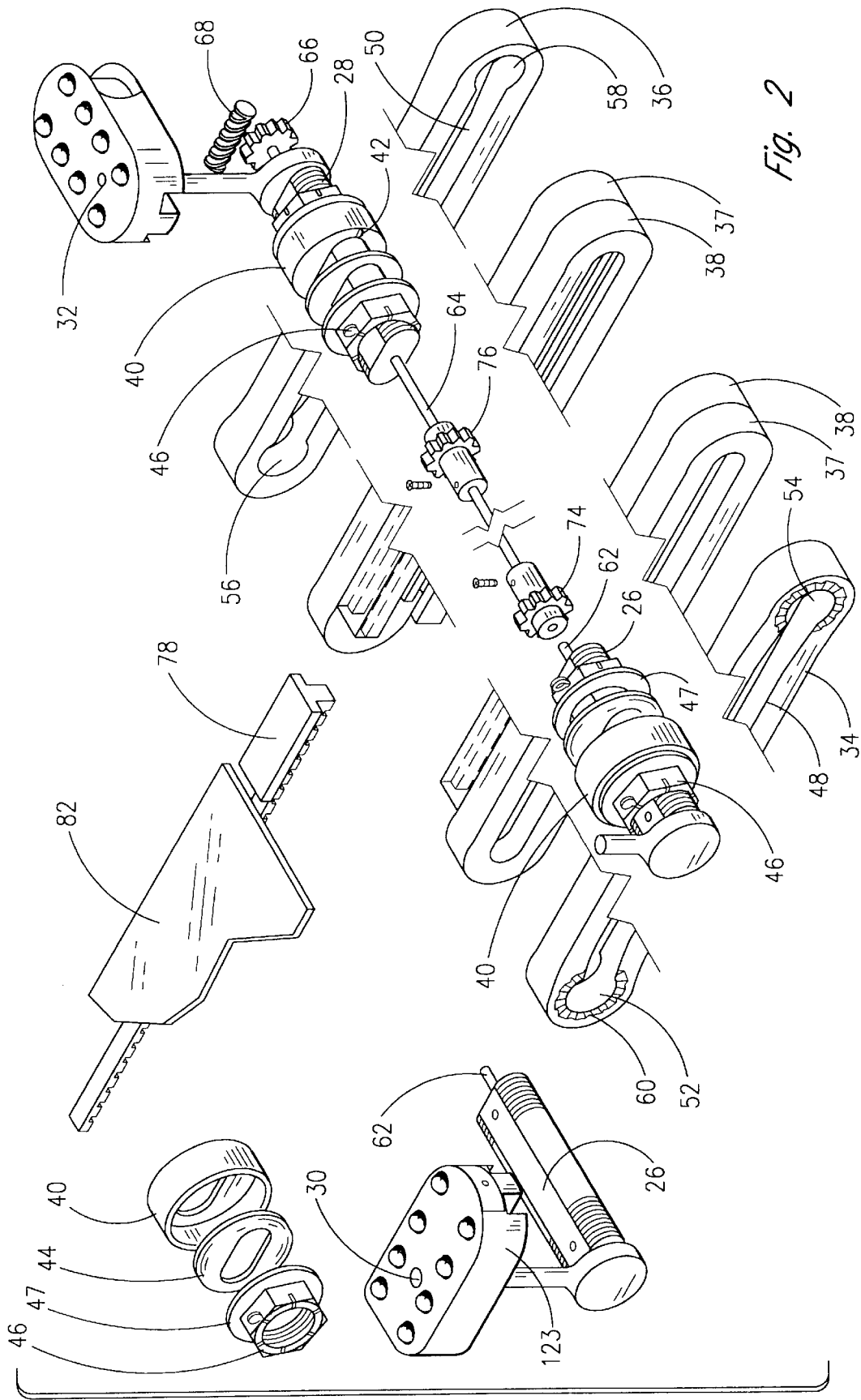
FIG. 2 is an exploded portions of the sunvisor shown in FIG. 1.

Each boot 26 and 28 resides within a guide support structure 34 and 36 which may be readily seen from the exploded view shown in FIG. 2. Each boot is substantially oblong in shape having a pair of opposed, flat surfaces. The boots can be threaded and readily seen in FIG. 2.

As will be appreciated from the present description, each boot remains stationary with respect to the sunvisor shell which moves thereabout. The guide support structure is surrounded by a spring cap 40 which has an oblong interior cut out and ribbed surface 42, a flat spring 44 and a king nut 46 upon the outer surface. On the inner surface the guide support structure has a flat washer 47 which has an oblong interior cut out and a king nut 46, all seen in FIG. 2.

Each guide support structure 34 and 36 includes an elongated slot 48 and 50, respectively. Upon at least one end of the slot is a flared circular opening. Slot 48 thus includes flared circular opening 52 and 54 while slot 50 includes flared circular openings 56 and 58.

The ribs on the spring cap 40 remain parallel to and within the elongated slot until the boot is within one of the flared circular openings.

As will be appreciated, the boot remains stationary and the sunvisor shell moves so that the slot moves in relation to the boot. When the boot is outside of the slot, in other words, in one of the flared circular openings, the ribs will mesh with receiving ribs 60 which are upon a raised surface. The spring cap will thus supply enough force to press the ribs against the receiving ribs on the guide support. The radial position of the sunvisor shell will thus remain in place until overcome by the user or by the force of the motor which will be described hereinafter.

Figure 3:
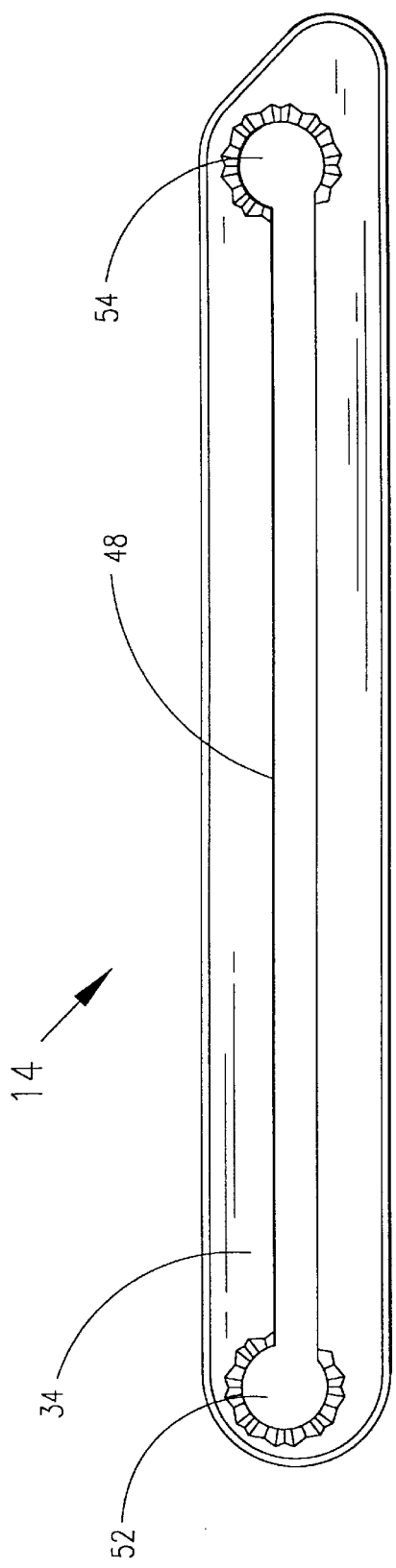
FIG. 3 is a side view of the sunvisor shown in FIG. 1.

FIG. 3 illustrates a side view of one of the guide support structures 34. The slot 48 is interior to sunvisor shell 14. The flared circular openings 52 and 54 are at opposite ends of the slot. The flared circular openings can be centered or offset. The exterior design or shape of the sunvisor shell may also be observed and is a matter of choice.

It will be appreciated that the exterior shape of the sunvisor shell may take other forms for aesthetic or other reasons.

With further reference to FIGS. 1 and 2, the gear drive mechanism in the present invention may be observed. Protruding outward from the end of the boot 26 is a short bearing rod 62. The bearing rod is received by a longitudinal hole in gear 74. Extending outward from the opposite boot 28 is a shaft 64 which passes through the boot 28 and is rotatable therein and extends to a gear 66. The gear is drivingly engaged with a worm gear 68. The worm gear is at the terminus of a rotatable, flexible shaft 70 as seen in FIG. 1. Any type of gear arrangement could be employed. The flexible shaft which comprises a core 124 and a casing 126 is rotated by a motor 72 such as a small electrical motor which might be recessed within the headliner or elsewhere within the vehicle. As shown in this embodiment, the flexible shaft slides within a slot 73 as the visor is moved laterally on the track. The motor would be powered by the electrical system (not shown) of the vehicle. It will be understood that other mechanisms might be utilized to rotate the shaft 64 such as hydraulic or pneumatic mechanisms.

Returning to a consideration of FIG. 2, the shaft 64 turns a pair of gears 74 and 76 which extend radially from the shaft and can be molded to the shaft or mounted as shown with set screws and divots in the rod.

Each gear 74 and 76 meshes with a rack 78 and 80. The gears rest in and are guided by elongated slots upon inner supports 90 and 92. Rotation of the shaft 64 by the motor will cause the gears 74 and 76 to rotate. Rotation of the gears will cause the racks 78 and 80 to move linearly.

In at least one embodiment, the rack remains stationary with respect to the sunvisor shell 14. As will be described herein, in other embodiments, the rack is flexible and movable to allow for extension or retraction of a glare shield. FIGS. 1 and 2 illustrate an embodiment with an extendible and retractable glare shield 82.

FIG. 4 is a sectional view taken along section line 4—4 of FIG. 1.

In the embodiment shown in FIG. 4, the glare shield 82 is attached to the racks 78 and 80. The racks are flexible and extend beyond the edge of the glare shield and are not permanently secured to the sunvisor shell. Rather, a switch 104 may be operated so that the rack is movable with respect to the shell or is stationary with respect to the shell. When the racks 78 and 80 are stationary with respect to the shell, the rotation of the gears 74 and 76 will cause the shell to move with respect to the boots. In the alternative, when the switch allows the racks to move, rotation of the gears 74 and 76 will cause the racks to move which will, in turn, cause linear movement of the glare shield 82. Depending upon the rotation of the gears, the glare shield will either extend from the shell or retract into the shell through slot opening 84.

The glare shield is retained between rack gear retaining rails 86 and support rails 88. Rack gear retaining rails 86 also serves as a guide for the flexible rack gear 78. They are upon the inner and upper surface of the sun visor shell and continue on around to the lower surface. Lateral movement of the glare shield 82 is prevented by supports 90 and 92.

FIG. 5 illustrates an alternate embodiment from those shown in FIGS. 1 through 4.

The embodiment shown in FIG. 5 also includes a glare shield 82. The gears 96 and 98 are shaped differently although they operate in the same manner. Additionally, a single lower rail 100 for each side of the glare shield is provided in a different position as well as a pair of rack gear retaining rails 102.

Returning to a consideration of the embodiment of the sunvisor 10 shown in FIGS. 1 through 4, the operation of the sunvisor shell and the glare shield 82 may be observed. When the drive gears 74 and 76 are rotated by rotation by the shaft 64, they engage with the teeth on the gear racks 78 and 80. To move the sunvisor shell 14 either forward or backward; the sunvisor shell is moved with relation to the boots 26 and 28 which slide within the slots 48 and 50. The boots 26 and 28 remain stationary at all times and the sunvisor shell itself moves with respect thereto. While the boots are in the slots, the sunvisor shell moves linearly with respect to the boots. When the boots are within either of the flared circular openings, the sunvisor shell moves radially with respect to the boots. The movement of the sunvisor shell is accomplished by the motor 72 which is controlled by a switch 104 as seen in FIG. 1. The switch may take various forms as are well known.

The sunvisor 10 also includes a solenoid 106 which operates a plunger 108 to extend or retract the plunger. The plunger may have an extension 110 with a spring 112. Upon the end of the extension is a small disc 109 which reduces friction for ease of sliding over the latch 114. When the plunger extension 110 is extended, the racks 78 and 80 are stationary with respect to the sunvisor shell 14. When the plunger extension 110 is retracted by operation of the solenoid 106, latch 114 is retracted and rotation of the gears 74 and 76 will move the racks 78 and 80. In this position, the racks 78 and 80 are free to move with respect to the sunvisor shell. Accordingly, the sunvisor shell will remain stationary because of the spring cap assembly 40 and the racks will move thereby moving the glare shield 82. The glare shield 82 will thus be extended or be retracted through the opening.

The spring 112 causes the extended plunger to remain extended except when energized. The solenoid 106 will also be controlled by the switch 104. It will be appreciated that either a linear or rotary solenoid or other switching mechanism might be employed.

An optional safety mechanism may be utilized. When the glare shield 82 is fully extended, the latch 114 extending from the glare shield will hit a plunger 116 of a stop switch 118 which interrupts power and stops movement of the glare shield. This prevents the glare shield from depending from the slot and further prevents the whole assembly from rotation and hitting the user.

The glare shield can be made of any light diffusing material. It may be somewhat opaque if to have an extended visor rather than glare shield is desired. Alternatively, a vanity mirror could be incorporated into the visor.

Figure 6:
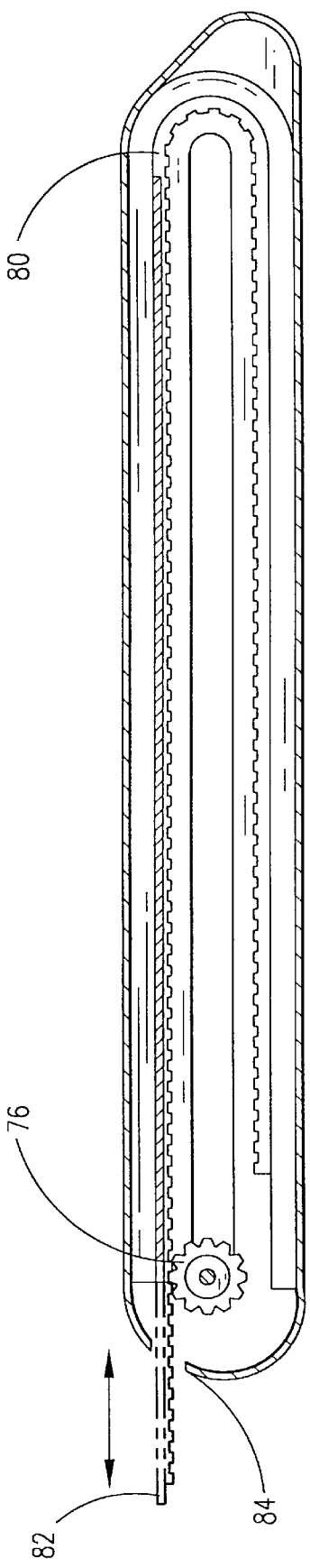
FIG. 6 is a sectional view taken along section line 6—6 of FIG. 1.
Figure 7:
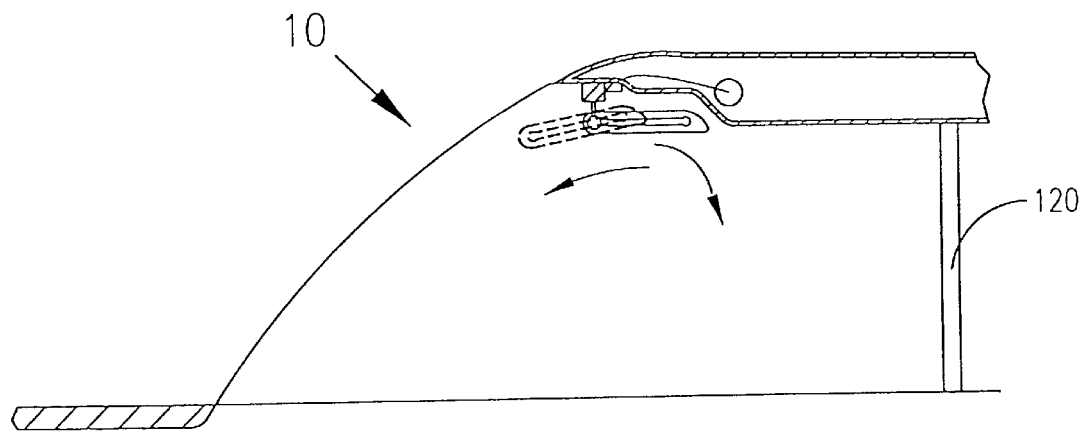
Figure 8:
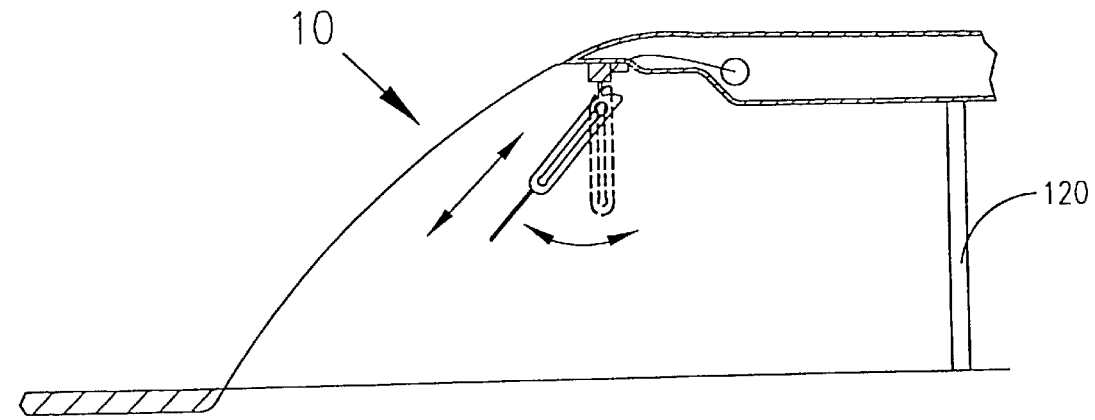

FIG. 6 shows a sectional view illustrating movement of the glare shield 82 which is taken along section line 6—6 of FIG. 1. In this view the glare shield 82 is partially deployed through slot opening 84. It can be seen that the flexible gear rack 76 and 80 are moved in their rack gear retaining rails 86 and 88 as the glare shield is extended or retracted. FIGS. 7 and 8 show the operation of the sun visor 10 with respect to a vehicle 120. FIG. 7 illustrates the linear movement of the sunvisor shell with respect to the boots 26 and 28. Also shown as an optional placement is the motor and flexible shaft.

FIG. 8 illustrates the radial movement of the sunvisor shell while the boots are within one of the flared circular openings.

Figure 9:
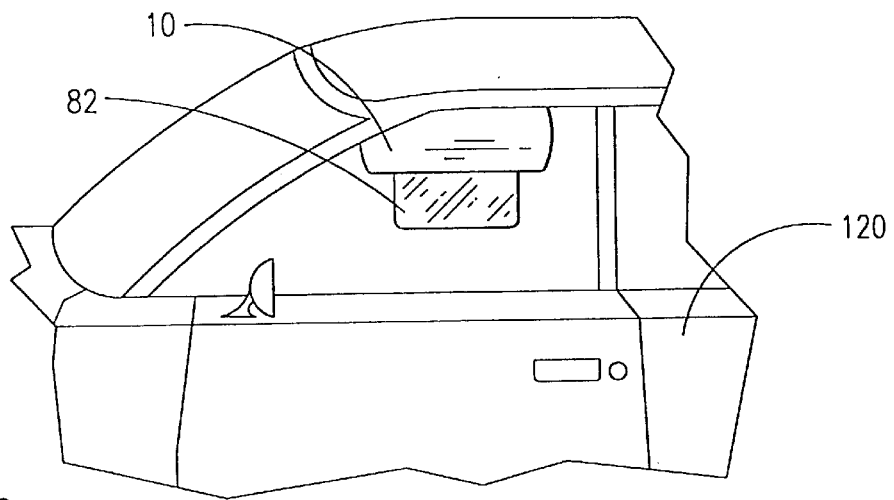
FIGS. 7, 8 and 9 are simplified diagrams showing the use and repositioning of the sunvisor with respect to a vehicle.

Finally, FIG. 9 illustrates movement of the sunvisor shell on the track assembly 16 so that the shell has moved over to the passenger side window. Additionally, FIG. 9 shows the glare shield 82 in the extended position.

Returning to a consideration of FIG. 1, the operation of the sunvisor shell 14 with respect to the track assembly 16 may be observed. The sunvisor shell 14 moves upon the track 18 as described. The shell 14 is supported between boot arms 22 and 24 respectively. The boot arms are pivotally mounted to block housings 142 and 144, respectively. The block housings are allowed to slide within the track housing 18. The arms travel up into the track housings through a track slot 122 which is visible where the track 18 has been cut-away.

To activate the sunvisor, the user pushes a button switch on the control panel 104. The control panel 104 permits electrical energy to pass to the track motor 170, which can be remotely placed in the vehicle. The track motor 170 has a flexible shaft 124 attached to it which rotates within a flexible housing 126. As the flexible shaft 124 rotates it turns the drive gear 148 (which is shown out of and to the right of the track corner housing 180). The drive gear 148 has a top gear 178 molded on it that meshes with a worm gear on the end of the flexible shaft 126 (not shown).

As the worm gear turns the drive gear 148, gear pixels 182 mesh with the drive belt 146 and move it. The drive belt is a flexible, elorgatable material that wraps around block housings 142 and 144. TChe drive belt is secured upon at least one housing by an end cap 143 (also see FIG. 2).

As shown in FIG. 1, the belt has receiving holes but it is understood that it could be ribbed or have any number of other surfaces necessary to create friction between it and the gear.

As the drive belt 146 is driven, the leading arm 22 of the sunvisor is pushed down the track side 20.

The track sides 18 and 20 substantially form a right angle triangle. As the sunvisor shell goes around the corner, the distance within the track between the arms increases and the belt will stretch to accommodate this. At the halfway point around the track, the gear 148 now starts to pull the trailing arm 24 down the track side 18 which in turn is now pushing the leading arm 22 down the track side 20. The mechanism includes both a pushing and pulling action. The gear 148 must first push the leading block 142 approximately half way down track side 20 and then gear 148 starts to pull the trailing block 144 on to the corner of the track until the sunvisor 14 is parallel to one of the side windows.

A corner belt guide 184 prevents the belt from collapsing on itself at the corner. Block 144 is always in the forward track and cannot negotiate the corner; therefore, when the user pushes the button switch 104, the visor will only travel as far as the corner and then stop. Likewise, the block 142 always stays in side track 20.

Optionally, a limiter switch (not shown) could be placed in the track assembly which, once activated by one of the boots, would shut off the motor.

To allow each block to move easily within the track, each block has receiving indentations or holes 186 which have small bearings 188 placed within them, half on top and half on the bottom of each side of the block. These allow the block to roll effortlessly along the track. In the rest position or home, the sunvisor has a rearward overhang and is causing the greatest force upon the front top bearings and on the lower rear bearing. When the sunvisor is slid forward it has a forward overhang and is causing the greatest force upon the rear top bearings and the forward lower bearings.

FIG. 10 illustrates an alternate embodiment 130 of the sunvisor without a glare shield. The gears 132 and 134 engage with racks 136 and 138 which are secured to the sunvisor shell 140.

FIG. 11 illustrates a sectional view taken along line 11—11 of FIG. 10 and shows a fixed gear rack upon the top of housing.

Figure 12:
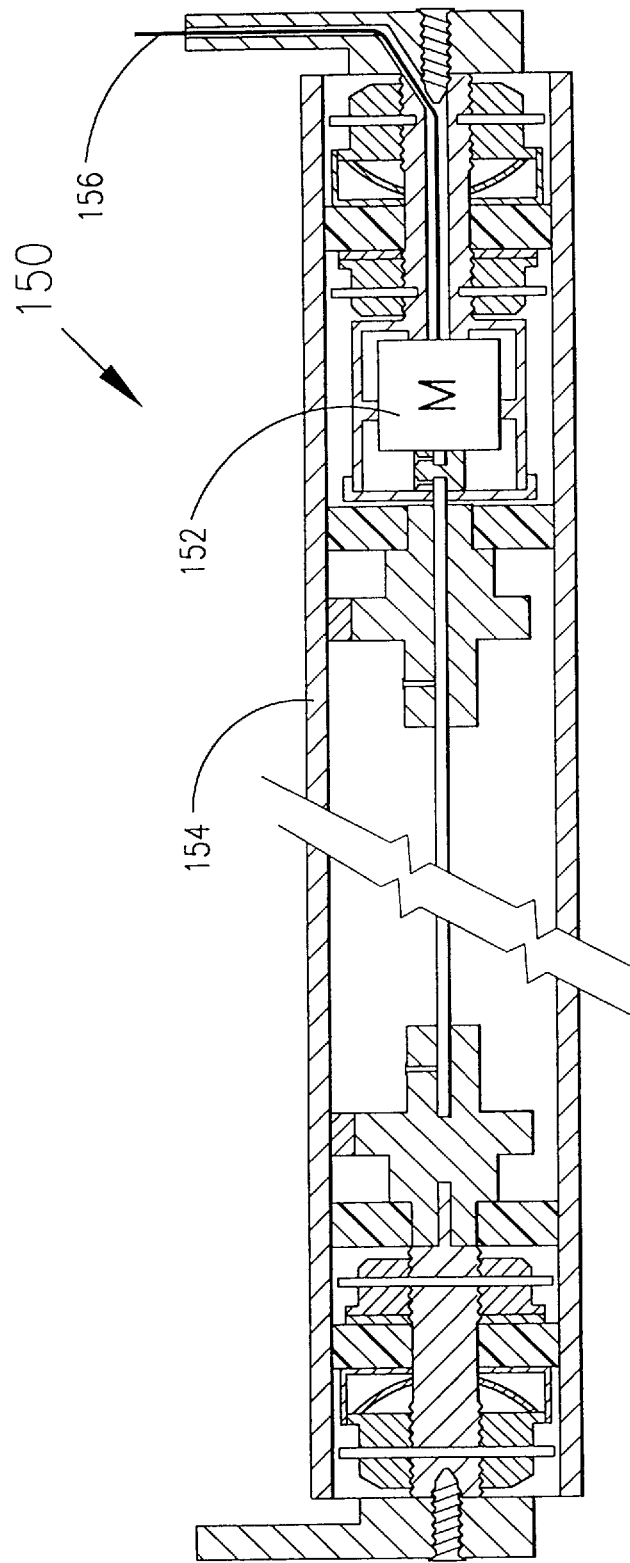
FIG. 12 is an alternate embodiment of the sunvisor without a glare shield and with the motor located within the sunvisor shell.

FIG. 12 illustrates a further embodiment of the sunvisor 150 without a glare shield. The motor 152 is located wholly within the sunvisor shell 154. The motor 152 would be supplied with electricity via line 156. The sunvisor 150 would operate substantially as in the other embodiments.

Within the spirit and scope of the present invention, alternate embodiments of the track assembly are possible. FIG. 17 illustrates an alternate track assembly 250.

In this embodiment, the visor track assembly 250 has a reduced number of moving parts. The visor shell moves to the side window position by being pulled by a flexible shaft, cord, or strand with engagement racks attached to the flexible shaft. In a preferred embodiment, it is simple in operation and extremely reliable for moving the visor shell between the front position to the side position.

As seen in FIG. 17, it works on the principal of two arms being pulled or pushed at different times by the engagement mechanism.

To activate, the user pushes a switch 252 which activates a reversible motor 254 which turns a pulley 256. As the pulley is turned, it will either push the flexible shaft 258 inside of its flexible but rigid housing 260, or pull the shaft 258 in the housing. The pulley 256 is inside a pulley housing 262 which keeps the cord wound but releasable. When the flexible shaft 258 is wound on the pulley 256, the housing is not needed as the shaft would just wind on the pulley.

The visor shell 265 starts in the home position aligned with the front position. In this position, the shaft 258 is held within a receiving contour 264 and continues along the center of the left or right side and continues on around the front side of the track to the opposite end of the track. It will be observed that the receiving contour is partially cylindrical in nature and partially torroidal in nature.

The flexible shaft 258 includes two engagement racks 266 and 268, respectively. The engagement racks are cylindrical in nature with teeth on the front and a slot along the back. They can be crimped on or secured to the flexible shaft. In the fully forward position, engagement rack 266 is in front of and aligned with carriage 270. The carriage has receiving holes 280 for bearings 282 which allow for easier sliding. The carriages have engagement teeth 284 on one side. In this position, the engagement rack and carriage are not in contact with each other. When activated, the flexible shaft 258 is pulled in and along the contour 264 and is wound upon the pulley 256 which is driven by the motor. As the flexible shaft 258 is pulled along, at first, the leading arm carriage 272 is in contact with the engagement rack 268 which is moved by the flexible shaft. Each carriage 270 and 272 have extending teeth capable of engaging with racks 266 and 268, respectively.

At first, the leading arm is travelling in a linear path while the trailing arm is mostly pivoting as the visor goes around the corner. The leading arm is initially travelling faster than the trailing arm. Initially, engagement rack 266 will actually pass trailing carriage 270 and will no longer be aligned with it. It is spaced from and free from contact with the trailing arm until approximately half way down the front side. As the leading carriage 272 nears the center of the side, it starts to slow as the visor reaches the half way point of being to the side window. It also reaches an outward contour upon the front side of the track wall. This contour draws the cord 258 and engagement rack 268 upon the cord 258 away from the leading arm carriage 272. The leading arm carriage is now spaced from the rack and free from engagement. Just prior to this, the trailing edge carriage is reaching the contour along the front side of the front track. This section is contoured inward and causes the cord 258 with the engagement rack 266 to engage trailing carriage 270. Now the trailing carriage arm is starting to travel in a more linear path and is speeding up while at the same time the leading arm carriage 272 is slowing down and pivoting more. The visor shell, thus, will be moved into a position relatively parallel to the side window. When the visor arm reaches the end of slot 274, it will stop.

Optionally, a limiter or stop switch could be incorporated into the track which would be tripped and stop the visor. During this movement of the visor, the cord 258 is pulled and wound upon the pulley 256 which can be placed in a remote location. When the visor is returned to the forward position, the cord is being pushed or unravelled off of the pulley 256. There is a casing or housing 262 around the pulley with a hole or slot to release the cord 258 as it is unravelled. The cord is surrounded by a semi-rigid flexible housing which serves to guide the cord as it is unwound from the pulley 256.

When it is unwound the operation of above is reversed. In this manner, both arms cannot be engaged at the same time. The track sides 18 and 20 substantially form a right angle. Along with visor shell 265, they form the hypotenuse of a right angle triangle. The length of the right angle leg is the distance from the corner to the carriage. Since the length of the hypotenuse doesn't change, the right angle legs change with respect to each other. Accordingly, the arms are travelling at varying speeds as the visor shell moves. The distance between the two arms within the track housing increases as the visor nears the center of the turn and then the distance decreases.

Figure 13:
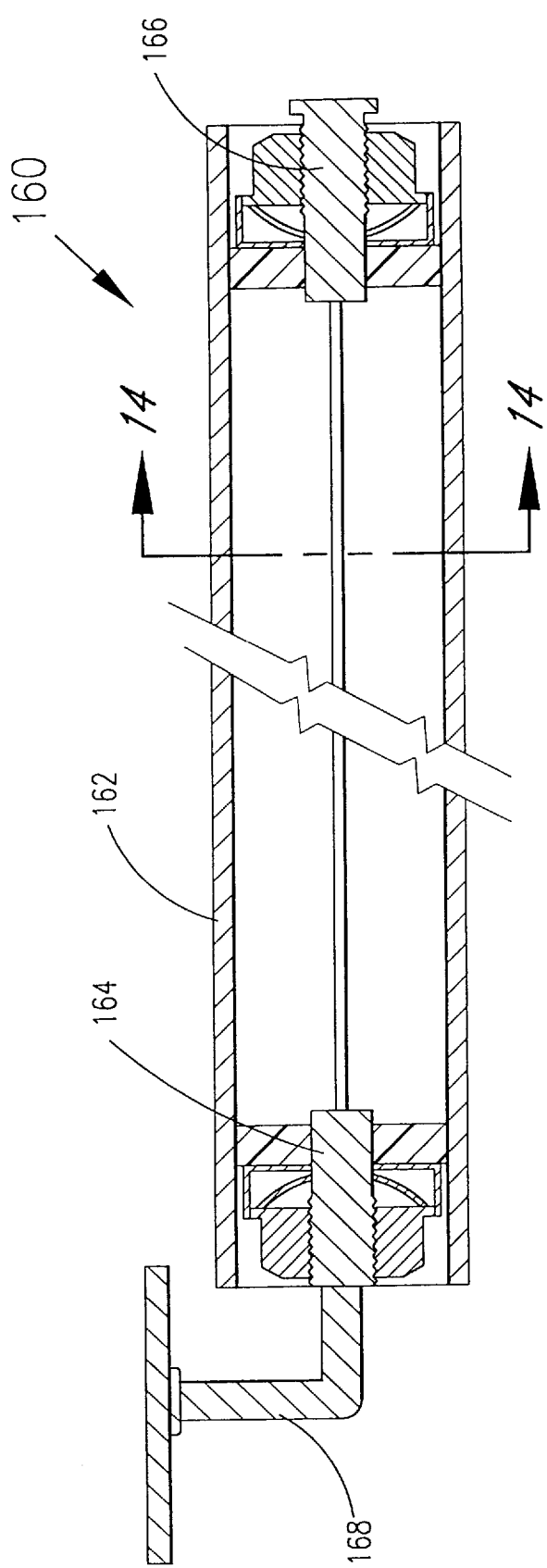
FIG. 13 is a further alternate embodiment of the sunvisor which may be manually positioned.
Figure 14:
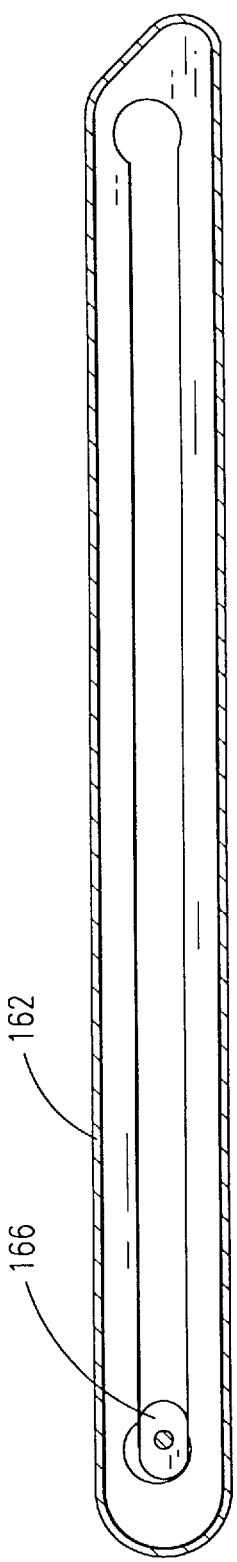
FIG. 14 is a sectional view taken along section line 14—14 of FIG. 13.

An alternate embodiment of the sunvisor 160 is shown in FIGS. 13 and 14. The sunvisor shell 162 will be moved manually with respect to the boots 164 and 166.

FIG. 14 is a sectional view taken along line 14—14 of FIG. 13.

In this embodiment, the boots 164 and 166 are upon the shaft and fixedly mounted to the shaft which also serves as a visor roof support.

FIGS. 15 and 16 illustrate a further alternate embodiment of a sunvisor 200 that may be moved manually.

A sunvisor shell 201 slides forward and rearward upon a support rod 202 which is curved at one end and terminates in a bracket 204 which travels in a track 205. The sunvisor assembly shown in FIGS. 15 and 16 is a driver's side visor; the passenger's side would be reversed. The sunvisor shell 201 has a forward leading edge 240 which lies parallel and adjacent the windshield (not shown) in the rested position. The shell has a top side 271 which is generally rectangular in shape and is formed by the forward leading edge being one of the longitudinal sides; and a trailing edge 241 parallel to the forward leading edge and being the other longitudinal side of the visor shell. The ends of the shell are formed by an outer flexible end 299 and an inner visor arm end 242. The shell's bottom side 269 which is seen through the mirror cutout has the same shape as the top side of the shell, is below and lies on a plane that is parallel the top side of the shell. This creates a cavity within the shell. The shell may be molded with a living hinge which is the trailing edge 241; this allows the shell to be folded together over the support rod 202. The shell is snapped together along the forward leading edge snap points 265 using common methods of closure.

The ends of the shell 299 and 242 are generally perpendicular to the forward leading edge 240. The outer flexible end 299 is formed with a curvature to create a shape that keeps the sun from shining in at the upper corner of the windshield. The shape would vary based upon the vehicle. The inner visor arm end 242 is formed when the top and bottom sides of the shell are folded together creating an elongated opening in the inner visor arm end 242. The inner visor arm end 242 now has an elongated opening which is perpendicular to the forward leading edge 240 of the shell. The support rod 202 passes through the elongated opening in the end of the shell. The support rod is between the top oide 271 and the bottom side 269 of the visor shell and is parallel to the forward leading edge of the shell but perpendicular to the inner visor arm end 242.

Within the interior of the shell 201 is a molded elongated clamp support 208. The elongated clamp support may be a molded part of the interior of the top and bottom sides of the shell. The elongated clamp support creates an oblong slot 297 in which a clamp 206 can slide. The oblong slot lies perpendicular to the longitudinal sides of the visor shell beginning near the forward leading edge 240 and continuing toward the trailing edge 241 of the shell. The oblong slot's longitudinal sides lie generally parallel and adjacent to the inner visor arm end 242 of the visor shell. The elongated clamp support's 208 inner surface is created by molding the surface thicker than the shell thereby creating a shelf 276. The shelf is created on the inner side of the top and on the inner side of the bottom of the shell housing. The shelf surface is parallel to the shells top and bottom sides. The width of the shelf area matches the clamp 206 and therefore creates a slot in which the clamp may slide.

FIG. 23 is a sectional view taken along section line 23—23 of FIG. 15. The support rod 202 is a lengthened piece of metal that has a round exterior. The clamp 206 is formed of a pretreated metal and exerts a spring force that compresses against the support rod 202. The clamp is molded as one piece. The clamp has a top side 298 which has an inner surface 286 and an outer surface 207. The clamp has a back longitudinal edge which is molded as an arc that curves from the top side and continues around generally perpendicular to the top surface 298 and continues until it is again parallel to top side 298. This creates a bottom side 288 which is now parallel and below the top surface. The bottom side 288 has an inner surface 287 and an outer surface 276. The top and bottom sides of the clamp are sufficiently wide as to allow the shell to slide easily forward and rearward over the clamp. The front side of the clamp is open with the top sides leading edge 283 being curved inward and the clamps bottom sides leading edge 269 being curved inward thus assuring the shell will slide easily over the clamps surface. A hole is formed through each end of the clamp, creating an opening through which the support rod 202 can be slid. The support rod is slid through one of the end holes and is forced between the clamps top side 298 inner surface 286 and the clamps bottom surfaces 288 inner surface 287. The clamps top surface and bottom surface create compressive force against the rod. The force is sufficient to hold the visor shell in place parallel to a headliner but can be overcome by the user when the visor is rotated upon the rod into an in-use position. The clamp thus rotates radially about the axis of the rod.

Upon the longitudinal surface of the support rod is a chamfered section that creates a flat surface 281. The flat surface runs longitudinally along the rod and causes the clamp 206 to snap into place around the flat surface when the visor shell 201 is rotated toward the rested position. The flat surface 281 position is dependent upon the vehicles roofline rake. The flat surface created is generally parallel to the headliner's surface.

With the clamp in place around the support rod, the visor shell top inner shelf surface 277 and the visor shell bottom inner shelf surface 257 creates a surface upon which the clamp 206 can now slide forward toward the leading edge 240 of the visor shell or rearward toward the trailing edge 241 of the visor shell. The visor shell is sliding forward and rearward over the clamp top side 298 outer surface 207 and over the clamp bottom side 288 outer surface. The clamps longitudinal sides lie parallel to the forward leading edge 240 and parallel the trailing edge 241 of the visor shell. The support rod 202 also lies parallel to the forward leading edge and parallel to the trailing edge of the visor shell; and remains stationary as the visor shell 201 is slid forward and rearward over the clamp 206. The visor shells ends are being slid forward and rearward perpendicular to the rod and perpendicular to the clamp.

FIG. 16 shows several elements exploded. Interior to the clamp 206 is a flat washer 211 which is oblong in shape with a hole 279 offset and formed through its side. Interior to the flat washer 211 is a spring washer 212 which also has a hole 290 formed through its surface. Interior to the spring washer 212 is a travel guide 210 which can be a molded oblong plastic piece with a hole 291 formed and offset through its surface.

Referring back to FIG. 15, the rod is slid through a hole 289 in the end of the clamp. The travel guide, the spring washer and the flat washer are slid over the rod and into place between the clamp support 208 and an inner support 209.

As the visor is pivoted down into use, the offset hole allows the visor to rotate radially closer to the trailing edge. This allows the trailing edge 241 to pivot without interfering with the headliner.

Interior to the clamp support 208 is the inner support 209 which lies parallel and adjacent to the clamp support. The inner support is a molded part of the shell interior and when the shell is folded shut, a slot 296 is formed through which the visor rod 202 can slide.

The elongated clamp support 208 and the inner support 209 lie parallel each other and perpendicular to the forward leading edge of the visor. A space is in-between the longitudinal sides of the inner support and the clamp support. An inner side surface 295 of the clamp support 208 and the outer side surface 294 of the inner support 209 creates a space in which the travel guide 210 can slide.

The spring washer 212 forces the travel guide 201 against the inner support's outer side surface 294 and the spring washer 212 forces the flat washer 211 against the clamp support's inner side surface 295. The spring washer 211 provides just enough pressure to keep the travel guide and flat washer against the clamp support and the inner support but the force can be overcome by the user and therefore the visor shell will slide forward and rearward over the assembly. The travel guide 210 keeps the visor from wracking itself as it is slid forward and rearward. In other words the travel guide keeps the visor shell ends perpendicular to the clamp and support rod as the visor shell is slid forward and rearward over the rod. The travel guide and the flat washer also cause friction against the clamp support and the inner support, keeping the visor from sliding forward or rearward upon the clamp except by user force.

The support rod 202 is offset or bent leaving an elbow 267 just inside the inner support. The support rod continues on parallel to the visor shell top and bottom sides until just prior to the second inner support 209 which is identical to the other inner support. The support rod then curves back up at elbow 263 and the rod continues on parallel to the visor shell top and bottom sides into and through the holes drilled in the travel guide 210 the spring washer 212 and the flat spring 211. The travel guide, the spring washer and the flat spring are between the second inner support and the second clamp support. The support rod continues on into and through the second clamp 206. The clamp 206 slides in the oblong slot created by the clamp assembly structure.

The visor shell thus has both a linear movement and a radial movement. The user simply reaches up and pushes the trailing edge 241 of the visor forward and the visor shell will slide forward toward the windshield. When all the way forward, the user rotates the visor radially down into use and the clamp 206 and shell will rotate about the rod. The clamp's spring compression force is sufficient to hold the visor shell from rotation when not in use, but user force can overcome the spring force of the clamp upon the rod.

The bracket 204 sits in the track 205. Upon the side edges are receiving holes 214 for bearings 215 which allow the visor to travel easily within the track. The side walls of the bracket are contoured to receive the bearings. This embodiment may be center mounted in the vehicle with the pivot joint near the rear view mirror. With the center mount, the user will not be as apt to have to move his or her head out of the way when moving the visor to the side window position.

The visor shell may be pivoted to the side window or back to the front. Upon the bracket 204 are receiving contours 216 and 218 with indentations in the carriage which mesh with the formed ring 220 which has divots or raised bumps or protuberances 222. Immediately above the ring 220 is a flat spring 226 which pushes down on the formed ring 220. The ring 220 is slid over the rod 202 prior to flaring the end. It will be noted that the ring on the inner side has indentations 228 which match slots 229 in the rod 202. The prevents the ring from turning upon the rod.

In the at rest or home position aligned with the windshield, the divots 222 and contours 216 hold the visor parallel to the front windshield when the visor is being slid forward on the rod. The same is true for the side window as noted. There is at least one contour at 90° on the bracket and the visor rod is held parallel to the side window position allowing the user to slide the visor shell forward or rearward over the rod. The flat spring 226 force can be overcome by the user but is sufficient to hold the visor in place when being slid forward or rearward on the rod.

This visor provides a bearing means which addresses the need for stability, reduced vibration, strength in design and simplicity. Upon the carriage can be placed electrical contacts 230 which can then be attached to wires 232 for placement of a lighted mirror. When the visor is in the at rest or home position, the user would rotate the mirror downward for use. In the rest position, the carriage 204 is all the way to the right in the track 200 which has a receiving electrical connection 234 which supplies power to the contacts 230. Stop tabs 236 keep the carriage within the track after assembled.

Figure 18:
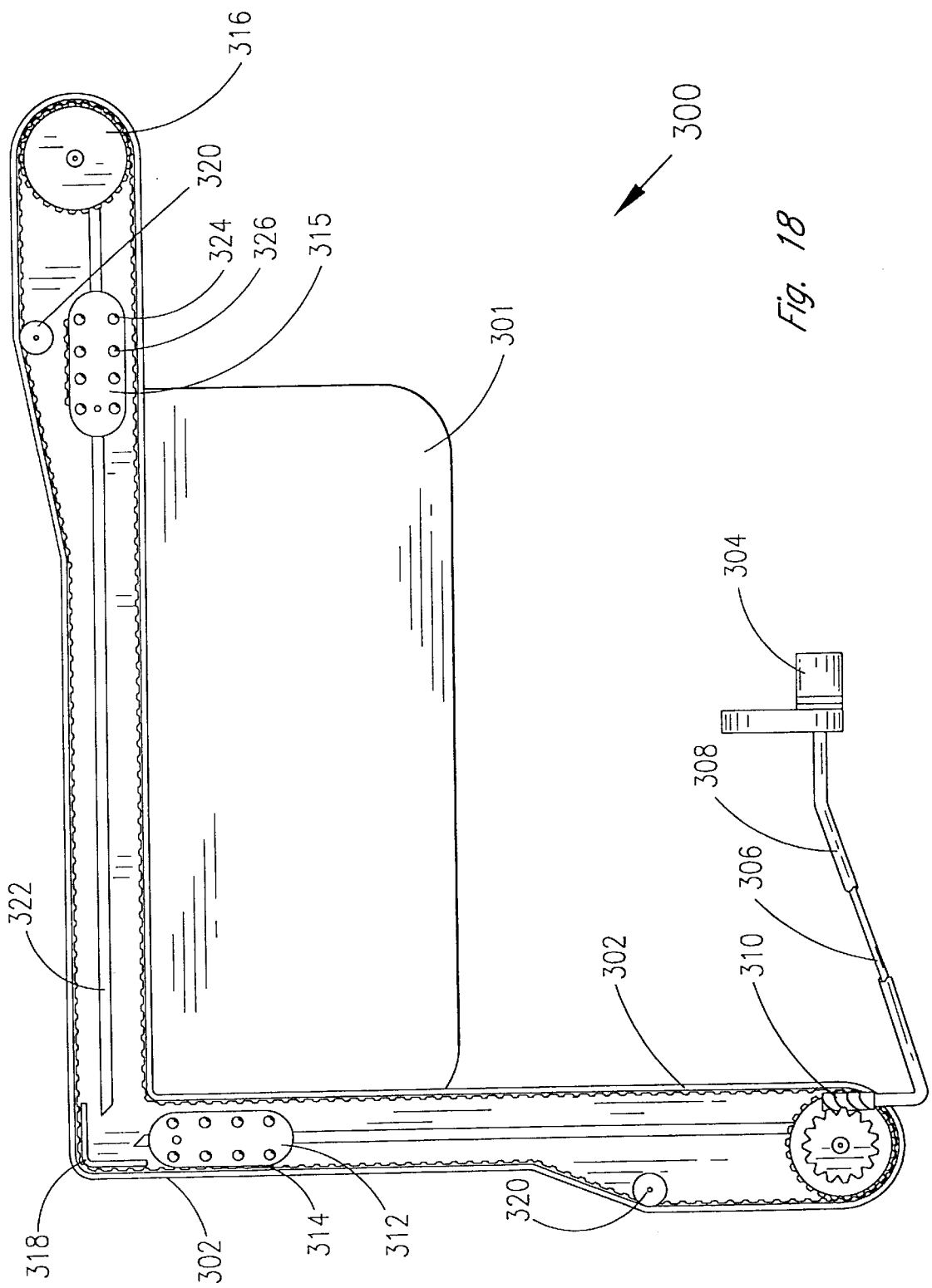
FIG. 18 is a sectional view of a further alternate embodiment of the track assembly for the present invention.

A further alternate track assembly 300 is illustrated in FIG. 18. In this track assembly, the track housing 302 is formed to allow a continuous belt to travel upon a path that will push and pull carriages at the appropriate times. In the figure shown, the visor shell 301 is nearly in the at rest or home position. When the motor 304 is activated, it turns a flexible shaft 306 which is within a flexible housing 308, which turns a drive gear 310. The drive gear 310 has a molded gear upon it which meshes with a worm gear of the flexible shaft. When the drive gear is turned, it drives the belt within the contoured and formed track. In the at rest or home position, the carriage 312 has teeth or a meshing surface 314 in contact with the belt and is pulled along within the housing. At approximately the halfway point, carriage 312 is freed from and spaced from the belt as the belt curves out away from the block 312 The teeth of block 315 teeth now mesh with the forward contoured area of the track and now this block is pulled along within the housing until the visor is to the side window position. A pulley 316 is placed at the other end of the track and the belt wraps around it.

There is a corner belt guide 318 which guides the belt around the corner of the track and can be molded into the track housing. The belt travels behind belt guides 320 after it leaves the inward contoured area. These guides separate the belt from the block and block gear rack 314. There is a slot 322 at the bottom of the track through which the visor arms pass.

The carriage has indentations or holes 324 which receive bearings 326 which allow the carriages to move easily within the track housing.

FIGS. 19 and 20 illustrate another further alternate embodiment of a sunvisor 400 that may be moved manually. A sunvisor shell 401 slides forward and rearward upon a support rod 402 which is curved at one end and terminates in a bracket 404 which travels in a track 405. The sunvisor assembly shown in FIGS. 19 and 20 is a driver's side visor; the passenger's side would be reversed. The sunvisor shell 401 can be molded of plastic or any similar material and has a forward leading edge 440 which lies parallel and adjacent the windshield (not shown) in the rested position. The shell has a top side 471 which is generally rectangular in shape and is formed by the forward leading edge being one of the longitudinal sides; and a trailing edge 441 parallel to the forward leading edge and being the other longitudinal side of the visor shell. The ends of the visor shell are formed by an outer flexible end 499 and an inner visor arm end 442. The shell's bottom side 469, which is seen through the mirror cutout, has the same shape as the top side of the shell, is below and lies on a plane which is parallel the top side of the shell. This creates a cavity within the shell. The shell may be molded with a living hinge which in this embodiment is the forward leading edge 440; this allows the shell to be folded together over the support rod 402. As shown, the visor shell could be molded with just the inner visor arm end 442 being hinged. The shell is then snapped together along the trailing edge snap points 465 using common methods of closure.

The ends of the shell are generally perpendicular to the forward leading edge 440 and consist of the outer flexible end 499 which is formed with a curvature to create a shape that keeps the sun from shining in at the upper corner of the windshield. The other end of the shell is the inner visor arm end 442 which is formed when the top and bottom sides of the shell are folded together, creating an elongated opening in the inner visor arm end 442. The inner visor arm end 442 now has the elongated opening that is perpendicular to the forward leading edge 440 of the shell. The support rod 402 passes through the elongated opening in the end of the shell. The support rod is between the top side 471 and the bottom side 469 of the visor shell and is parallel to the forward leading edge of the shell but perpendicular to the inner visor arm end 442.

Within the interior of the shell 401 is a molded elongated clamp support structure 408. The elongated clamp support structure is a molded part of the interior of the top and bottom sides of the shell. The elongated clamp support has a lower outer support rail 495 and an opposed upper outer support rail 453. The support rails are molded as a part of the inside of the bottom side 469 of the visor shell and a part of the inside of the top side 471 of the visor shell. A ledge 467 is formed on the interior side of the lower outer support rail 453 and runs perpendicular to the forward leading edge 440 of the visor shell. Looking now at the lower outer support 495, the ledge 467 begins at the forward leading edge and continues toward the back trailing edge 441 of the visor shell. The ledge is adjacent to and generally parallel to the inner visor arm end 442. The ledge has an integral longitudinal edge 410 molded to the shell bottom 469 which runs linearly perpendicular to the forward leading edge of the visor shell. A top longitudinal edge 411 of the flat ledge runs parallel the bottom edge and has been molded raised up off the inside of the bottom side 469 of the shell. The ledge 467 is angled transverse the bottom side 469 of the shell. The ledge continues outward from the integral longitudinal edge 410 and up to the top edge 411. This creates a surface upon which lower conical wheels may roll. In other words, the top edge 411 is closer to the inner visor arm edge 442 than the bottom edge 410. The angle created by the transverse ledge is dependent upon the angle of conical wheels. The top longitudinal edge 411 in the assembled position is now just below the support rod 402. The upper outer support 453 forms a flat ledge 483 which runs perpendicular to the forward leading edge 440 of the visor shell. The ledge 483 begins at the forward leading edge and continues toward the back trailing edge 441 of the visor shell. The ledge is adjacent to and generally parallel to the inner visor arm end 442. The ledge has an integral longitudinal edge 435 molded to the shells top side 471 which runs linearly and perpendicular to the forward leading edge of the visor shell. The bottom longitudinal edge 433 of the ledge 483 runs parallel the integral edge and has been molded lowered down off the inside of the top side 471 of the shell. The ledge 483 is angled transverse from the top side 471 of the shell. The ledge continues outward from the integral edge 435 and down to the bottom edge 433. This creates a surface upon which upper conical wheels may roll. In other words, the bottom edge 433 is closer to the inner visor arm end 442 than the integral edge 435. The angle created by the transverse ledge is dependent upon the angle of conical wheels used. The bottom longitudinal edge 433 in the assembled position is now just above the support rod 402. Once the shell has been snapped together, a convex shape is formed by the outer upper support and the outer lower support. A slot 484 is formed through which the support rod can slide and travel.

FIG. 20 illustrates an exploded and enlarged view of several elements. Interior to the outer supports is a clamp 406. The clamp is formed of a pretreated metal and exerts a spring force against the support rod surface. The clamp is molded as one piece. The clamp has a top side 498 which has an inner surface and an outer surface 407. The clamp has a back longitudinal edge which is molded as an arc that curves from the top side and continues around generally perpendicular to the top surface 498 and continues until it is again parallel to top surface 498; this creates a bottom side which is now parallel and below the top surface. The bottom side has an inner surface and an outer surface. The front side of the clamp is open. A hole 489 is formed through each end of the clamp, creating an opening through which the support rod 402 can be slid. The clamps outer end 449 and inner end 472 have four slots 413 in each end. The slots are placed at each outer corner of the clamp. The slots hold the wheel assemblies 446. Conical wheels 447 are at each end of the integral axle. The wheel assembly is placed within the slots 413 and the longitudinal axis of the axles lie parallel the longitudinal sides of the clamp. The conical wheels extend outward from the outside ends of the clamps' ends and have a slightly higher profile than either the top or bottom side of the clamp. A small one piece, curved spring clip 448 shaped like a "U" is placed on the outside of each end of the clamp and under all four axles; just inside the conical wheels inner side. This causes a small amount of vertical outward force on each axle, toward the elongated clamp support 408. Between the outer support rails and inner support rails is the interior structure of the elongated clamp support. The interior top side and interior lower side of the shell creates the interior elongated clamp support structure. Each end of the elongated clamp support 408 is identical. As can be seen in FIG. 20, the lower inner support 488 and the upper inner support 487 are identical to the outer supports and also create a slot 485 (when the shell is snapped shut) through which the support rod can slide. The support rod is slid through one of the clamps end holes 489 and is forced between the clamps top side 498 inner surface and the clamps bottom surfaces inner surface. The clamps top side and bottom side are creating force against the rod. The force is sufficient to hold the visor shell from rotation and in place parallel a headliner but can be overcome by the user when the visor is rotated upon the rod into an in-use position. The support rod 402 as shown is a lengthened piece of metal that has a round exterior. Upon the longitudinal surface area of the support rod is a cut section that creates a flat surface 481. The flat surface created runs longitudinally along the rod and causes the clamp 406 to snap into place around the cut section when the visor shell 401 is rotated toward the rested position. The flat surfaces' 281 formed position is dependent upon the vehicles roofline rake. The flat surface created is generally parallel the headliners surface.

Referring back to FIG. 19, the visor will slide forward and rearward over the support rod and clamp, and will also rotate down into use. With the visor shell 401 closed, the clamps conical wheel 447 will press against the elongated clamp supports lower and upper outer rails 495 and 453, respectively, and the elongated clamp supports lower and upper inner rails 488 and 487, respectively. The spring clip will maintain enough tension to keep the visor shell from sliding forward and rearward over the clamp assembly but can be overcome by user force. The user simply reaches up and pushes the trailing edge 441 of the visor forward and the visor shell will slide forward over the clamp assembly toward the windshield. When all the way forward, the user rotates the visor radially about the rod down into use and the clamp 406 will rotate about the rod. The clamp's force is sufficient to hold the visor shell from rotation when not in use, but user force can overcome the force of the clamp upon the support rod thereby allowing the shell and clamp to radially turn about the support rod.

FIG. 24 shows a cross-sectional view of the visor shell 401 with the clamp 406 being in place within the shell. The clamps bottom sides 450 and outer side 451 can be seen as the open end of the clamp is viewed. The clamp 406 is upon the support rod 402 and the conical wheels 447 can be seen resting against the ledges formed by the shell.

FIG. 21 illustrates an even further alternate embodiment of a sunvisor 500 that may be moved manually. A sunvisor shell 501 slides forward and rearward upon a support rod 502 which is curved at one end and terminates in a bracket 504 which travels in a track 505. The sunvisor shell 501 has a forward leading edge 540 which lies parallel and adjacent the windshield (not shown) in the rested position. The shell has a top side 571 which is generally rectangular in shape and is formed by the forward leading edge being one of the longitudinal sides; and a trailing edge 541 parallel to the forward leading edge and being the other longitudinal side of the visor shell. The ends of the visor shell are formed by an outer flexible end 599 and an inner visor arm end 542. The shell's bottom side 569 which is seen through the mirror cutout has the same shape as the top side of the shell and is below and lies on a plane which is parallel the top side of the shell. This creates a cavity within the shell. The shell is molded with a living hinge which is the forward leading edge 540. This allows the shell to be folded together over the support rod 502. The shell is snapped together along the trailing edge snap points 565 using common methods of closure.

The ends of the shell are generally perpendicular to the forward leading edge 540. The outer flexible end 599 is formed with a curvature to create a shape that keeps the sun from shining in at the upper corner of the windshield. The shape would vary based upon the vehicle. The inner visor arm end 542 is formed when the top and bottom sides of the shell are folded together, creating an elongated opening in the inner visor arm end 542. The inner visor arm end 542 has an elongated opening that is perpendicular to the forward leading edge 540 of the shell. The support rod 502 passes through the elongated opening in the end of the shell. The support rod is between the top side 571 and the bottom side 569 of the visor shell and is parallel to the forward leading edge of the shell but perpendicular to the inner visor arm end 542.

Within the interior of the shell 501 is a molded elongated clamp support 508. The elongated clamp support is a molded part of the interior of the top and bottom sides of the shell. The elongated clamp support has a lower outer support rail 595 and an upper outer support rail 553. The support rails are molded as a part of the inside of the bottom side 569 of the visor shell and molded as a part of the inside of the top side 571 of the visor shell. The lower outer support rail 595 is molded rising up off the bottom side of the shell interior, and stops at a longitudinal edge 511. The longitudinal edge lies just below the support rod in the assembled position and is parallel the top and bottom sides of the shell. The upper outer support rail is molded down off the interior of the shells top side interior; and stops at a longitudinal edge 533. The longitudinal edge lies just above the support rod in the assembled position. When the shell is snapped shut an elongated slot is formed by the upper inner edge 455 and the lower inner edge 494 through with the rod can slide.

FIG. 22 is an enlarged view of several components. Interior to the outer supports is a clamp 506. The clamp is formed of a pretreated metal and compresses against the support rods surface. The clamp has a top side 598 which has an inner surface and an outer surface 507. The clamp has a back longitudinal edge which is molded as an arc that curves from the top side and continues around generally perpendicular to the top surface 598 and continues until it is again parallel to top surface 598. This creates a bottom side which is now parallel and below the top surface. The bottom side is identical to the top side and has an inner surface and an outer surface. The front side of the clamp is open. A hole 589 is formed through each end of the clamp creating an opening through which the support rod 502 can pass.

The clamp's outer end 549 and inner end 572 each have four slots 513. The slots are placed at each outer corner of the clamps ends. The slots hold roller assemblies 546. The roller assembles 546 can be molded of plastic and are shown as one piece. The rollers rise slightly above the height of the clamp and have end axles of a smaller diameter than the rollers. The ends are placed in the slots. The roller assembly is placed within the slots 513 and the longitudinal axis of the axles lie parallel the longitudinal sides of the clamp. A small spring clip 548 is placed on the outside of each end of the clamp and under all four axles; just inside a small groove on the axles outer side. This causes a small amount of vertical outward force on each axle toward the shells top and bottom sides.

Referring back to FIG. 21, between the outer support rails and inner support rails is the interior structure of the elongated clamp support. The interior top side and interior lower side of the shell creates an interior elongated clamp support structure. A rack 590 which in this embodiment is molded upon the interior of the top side of the shell is molded just interior and adjacent to the interior elongated clamp support structure. The rack teeth lie parallel the support rod and clamp assembly. A gear 547 slides upon the end of the support rod. When the shell is closed, the gear teeth are in contact with the gear rack teeth and this keeps the visor shell from wracking when it is slid forward and rearward over the rod and clamp assembly. In other words, it keeps the shell ends perpendicular to the rod and clamp. The support rod passes through one of the clamps end holes 589 and is forced between the clamps top side 598 inner surface and the clamps bottom surfaces inner surface. The clamp's top side and bottom side are creating compressive spring force against the rod. The force is sufficient to hold the visor shell from rotation and in place parallel a headliner but can be overcome by the user when the visor is rotated upon the rod into an in-use position. The support rod 502 as shown is a lengthened piece of metal that has a round exterior. Upon the longitudinal surface area of the support rod is a chamfered, flattened section that creates a flat surface 581. The flat surface created, runs longitudinally along the rod and causes the clamp 506 to snap into place around the cut section when the visor shell 501 is rotated toward the rested position. The flat surfaces' 581 formed position is dependent upon the vehicles roofline rake etc. The flat surface created is generally parallel the headliner surface.

The visor will slide forward and rearward over the support rod and clamp, and will also rotate down into use. With the visor shell 501 closed, the clamps rollers 546 will press against the elongated clamp supports lower and upper interior surfaces respectively and the elongated clamp. The spring clip 548 will maintain enough tension to keep the visor shell from sliding forward and rearward over the clamp assembly but can be overcome by user force. The user simply reaches up and pushes the trailing edge 541 of the visor forward and the visor shell will slide forward over the clamp and gear assembly toward the windshield. When all the way forward, the user rotates the visor down into use and the clamp 506 and visor shell will rotate about the rod. The clamps force is sufficient to hold the visor shell from rotation when not in use, but user force can overcome the force of the clamp upon the rod thereby allowing the shell and clamp to radially turn about the support rod.

FIG. 25 shows a cross-sectional view of the visor shell 501 with the clamp 506 being in place within the shell. The clamp 506 is upon the support rod 502 and the gear 547 can be seen mounted upon the support rod and resting against the gear rack formed by the shell.

Whereas, the present invention has been described in relation to the drawings attached hereto, it should be understood that other and further modifications, apart from those shown or suggested herein, may be made within the spirit and scope of this invention.

What is claimed is:

1. A sunvisor for a vehicle, which sunvisor comprises:
   (a) a sunvisor shell having a pair of longitudinal sides;
   (b) a support attached to said vehicle;
   (c) a rod extending from said support, said rod having an axis;
   (d) at least one slot within said shell perpendicular to said longitudinal sides;
   (e) an oblong spring compression clamp having parallel top and bottom sides, said clamp surrounding and gripping said rod within said shell to allow said shell to move linearly in said slot parallel to said top and bottom sides of said clamp and perpendicular to said rod axis; and
   wherein said spring compression clamp is rotatable about said rod to allow said shell to move radially about said rod axis.

2. A sunvisor for a vehicle as set forth in claim 1 wherein said support is on a track, said support movable on said track with respect to said vehicle.

3. A sunvisor for a vehicle as set forth in claim 1 wherein said support includes a bracket having a plurality of bearings to permit said bracket to move within said track.

* * * * *